United States Patent
Satoh

(10) Patent No.: US 12,214,489 B2
(45) Date of Patent: Feb. 4, 2025

(54) CONTROL DEVICE, CONTROL SYSTEM, CONTROL METHOD, AND RECORDING MEDIUM WITH CONTROL PROGRAM RECORDED THEREON

(71) Applicant: NEC Corporation, Tokyo (JP)

(72) Inventor: Mineto Satoh, Tokyo (JP)

(73) Assignee: NEC CORPORATION, Tokyo (JP)

( * ) Notice: Subject to any disclaimer, the term of this patent is extended or adjusted under 35 U.S.C. 154(b) by 232 days.

(21) Appl. No.: 17/909,065

(22) PCT Filed: Mar. 31, 2020

(86) PCT No.: PCT/JP2020/014875
§ 371 (c)(1),
(2) Date: Sep. 2, 2022

(87) PCT Pub. No.: WO2021/199305
PCT Pub. Date: Oct. 7, 2021

(65) Prior Publication Data
US 2023/0089195 A1    Mar. 23, 2023

(51) Int. Cl.
*B25J 13/08*    (2006.01)
*B25J 9/16*    (2006.01)

(52) U.S. Cl.
CPC ................... *B25J 13/089* (2013.01)

(58) Field of Classification Search
CPC ............ B25J 13/089; B25J 9/1692; G05B 2219/39024

(Continued)

(56) References Cited

U.S. PATENT DOCUMENTS 4,727,471 A * 2/1988 Driels .................... B25J 19/023
                                                          700/262
4,831,549 A * 5/1989 Red ..................... G05B 19/4182
                                                          700/254

(Continued)

FOREIGN PATENT DOCUMENTS

| | | |
|---|---|---|
| CN | 110370286 A | 10/2019 |
| JP | 2004-525467 A | 8/2004 |

(Continued)

OTHER PUBLICATIONS

Fuchs, Stefan (2012) Calibration and Multipath Mitigation for Increased Accuracy of Time-of-Flight Camera Measurements in Robotic Applications. Dissertation, Technische Universitat, Berlin. relation: http://opus.kobv.de/tuberlin/volltexte/2012/3774/ (Year: 2012).*

(Continued)

*Primary Examiner* — Jaime Figueroa

(57) ABSTRACT

This control device calculates a parameter, which represents transformation between a first coordinate system for image information obtained by capturing an image of a target to be controlled and a second coordinate system for defining the movement of the target to be controlled, by using position information indicating the position of the target to be controlled in the first coordinate system and position information indicating the position of the target to be controlled in the second coordinate system. Further, the control device uses image information containing the target to be controlled and the calculated parameter to calculate the position information of the target to be controlled for the second coordinate system, and controls the target to be controlled on the basis of the calculated position information of the target to be controlled.

9 Claims, 19 Drawing Sheets

(58) Field of Classification Search
USPC .............. 700/245–264; 318/568.11–568.25
See application file for complete search history.

(56) References Cited

U.S. PATENT DOCUMENTS

| | | | | |
|---|---|---|---|---|
| 6,542,840 | B2* | 4/2003 | Okamoto | G06T 7/80 |
| | | | | 702/94 |
| 8,379,929 | B2* | 2/2013 | Sharp | G06T 7/70 |
| | | | | 382/106 |
| 9,188,973 | B2* | 11/2015 | Tenney | H04N 7/181 |
| 10,112,301 | B2* | 10/2018 | Deng | B25J 9/1692 |
| 10,262,406 | B2* | 4/2019 | Sakaguchi | G05B 19/41885 |
| 10,832,445 | B2* | 11/2020 | Gu | G06T 7/20 |
| 11,039,121 | B2* | 6/2021 | Myokan | G06T 7/80 |
| 11,235,176 | B2* | 2/2022 | Wang | G03H 5/00 |
| 11,494,941 | B2* | 11/2022 | Hsiao | G06T 3/20 |
| 11,577,400 | B2* | 2/2023 | Qian | B25J 13/089 |
| 11,896,849 | B2* | 2/2024 | Wang | G03H 5/00 |
| 2003/0033105 | A1 | 2/2003 | Yutkowitz | |
| 2009/0118864 | A1* | 5/2009 | Eldridge | B25J 9/1692 |
| | | | | 901/29 |
| 2010/0232682 | A1* | 9/2010 | Fujieda | G06T 7/60 |
| | | | | 382/154 |
| 2013/0010081 | A1* | 1/2013 | Tenney | H04N 13/20 |
| | | | | 348/47 |
| 2014/0018967 | A1 | 1/2014 | Matsumoto | |
| 2015/0005622 | A1 | 1/2015 | Zhao et al. | |
| 2016/0346932 | A1 | 12/2016 | Deng et al. | |
| 2017/0140521 | A1* | 5/2017 | Sakaguchi | G05B 19/41885 |
| 2017/0236262 | A1* | 8/2017 | Ohnuki | G06F 18/40 |
| | | | | 700/30 |
| 2018/0267142 | A1* | 9/2018 | Motoyama | G01S 7/4026 |
| 2018/0309978 | A1* | 10/2018 | Nobori | H04N 13/239 |
| 2019/0118394 | A1 | 4/2019 | Yamada et al. | |
| 2020/0177866 | A1* | 6/2020 | Myokan | H04N 13/246 |
| 2021/0008724 | A1* | 1/2021 | Qian | B25J 9/1692 |

FOREIGN PATENT DOCUMENTS

| | | |
|---|---|---|
| JP | 2014-014912 A | 1/2014 |
| JP | 2017-505240 A | 2/2017 |
| JP | 2019-077026 A | 5/2019 |
| WO | 2017/169143 A1 | 10/2017 |
| WO | 2018/043524 A1 | 3/2018 |

OTHER PUBLICATIONS

Bachiller, M., Cerrada, J.A. & Cerrada, C. A Modular Scheme for Controller Design and Performance Evaluation in 3D Visual Servoing. Journal of Intelligent and Robotic Systems 36, 235-264 (2003). https://doi.org/10.1023/A: 1023096511738 (Year: 2003).*
International Search Report for PCT Application No. PCT/JP2020/014875, mailed on Jun. 30, 2020.
English translation of Written opinion for PCT Application No. PCT/JP2020/014875, mailed on Jun. 30, 2020.

* cited by examiner

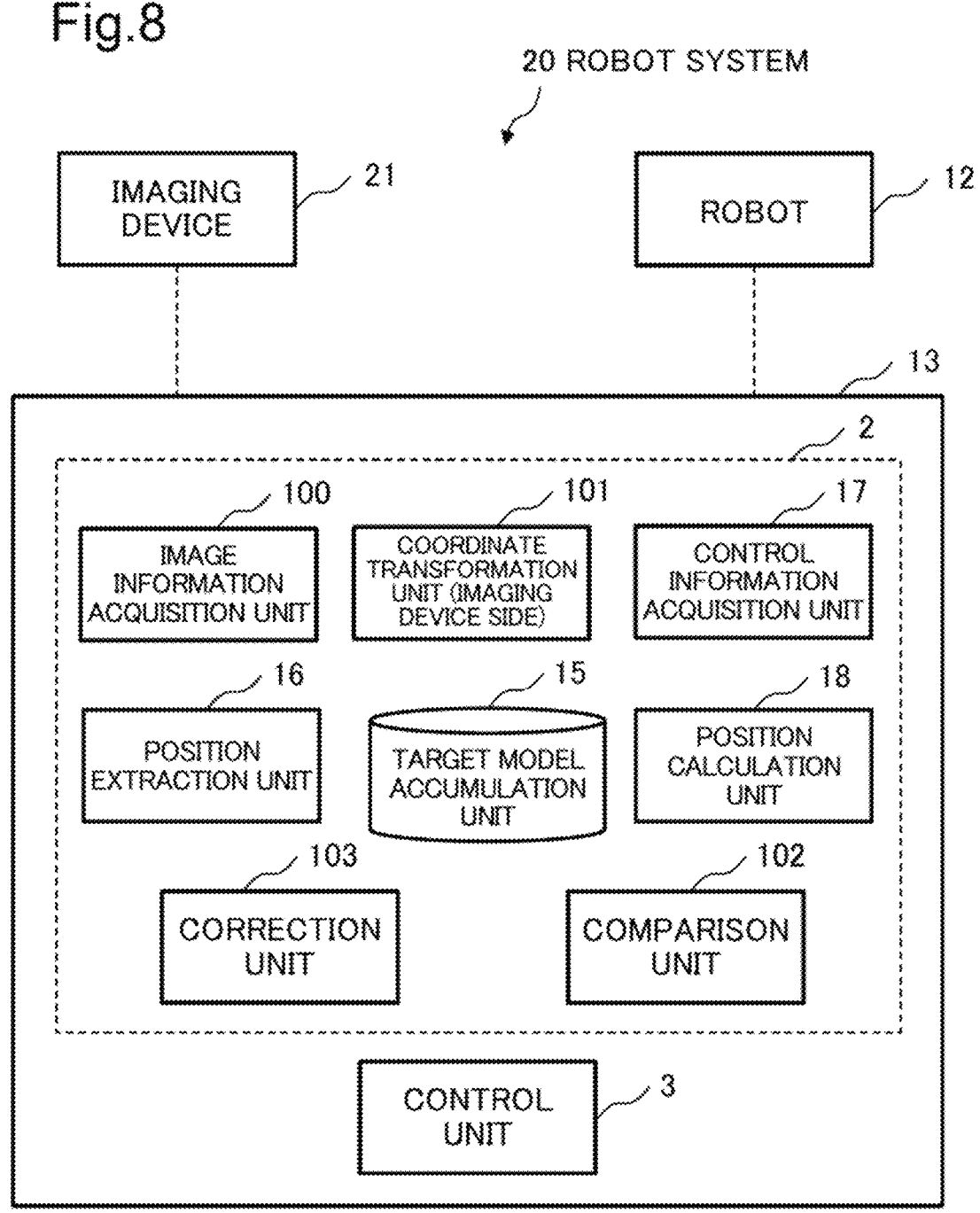

EXAMPLE OF DEVICE CONFIGURATION

T≠AP

EXAMPLE OF IMAGE INFORMATION
(DIFFERENCE PRESENT)

T=AP

EXAMPLE OF IMAGE INFORMATION
(DIFFERENCE ABSENT)

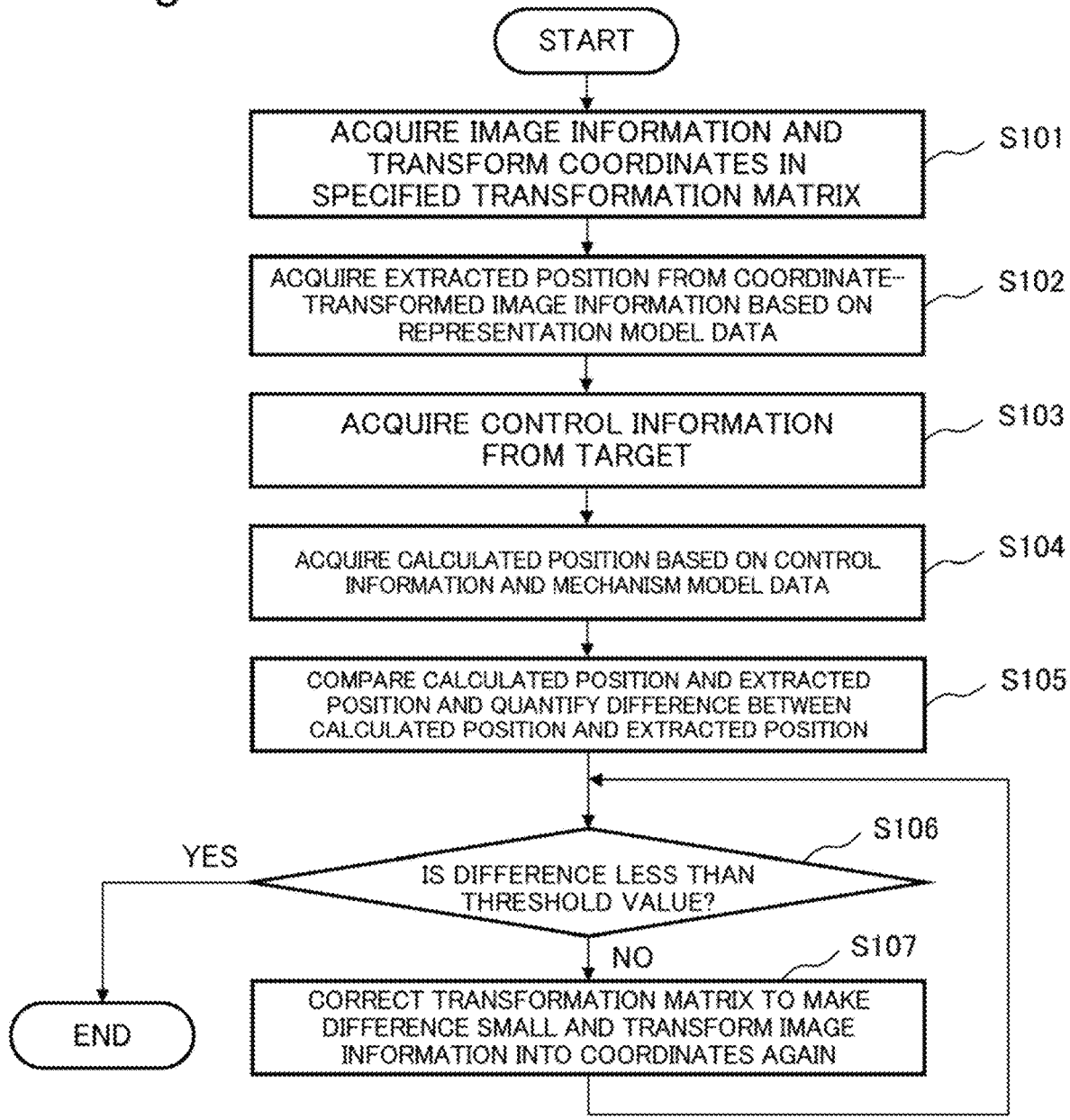

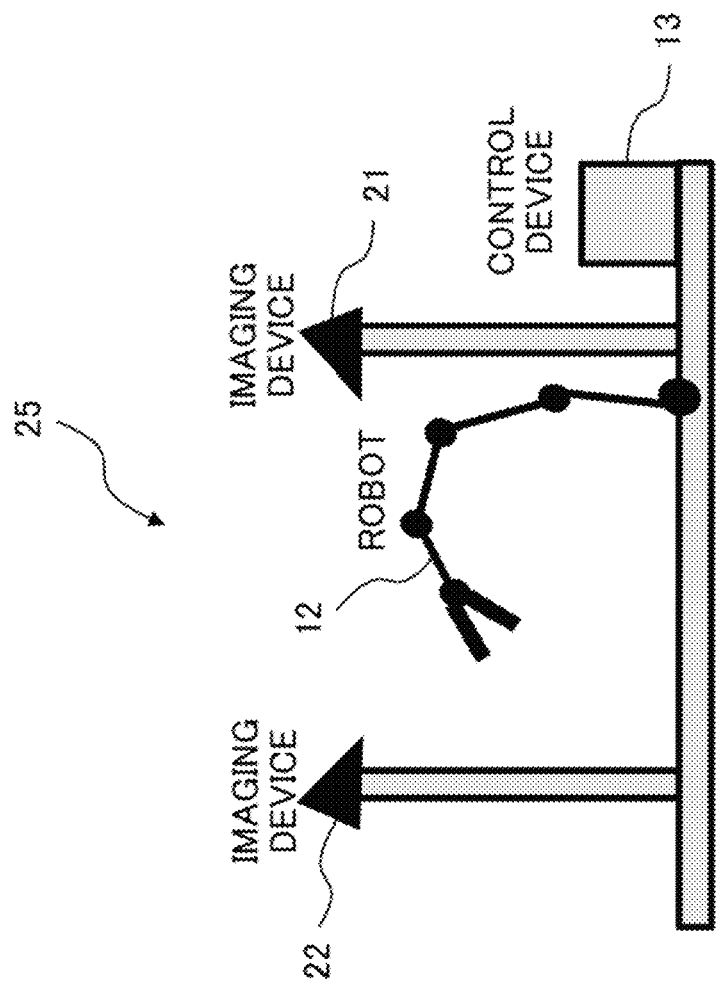

CONTROL DEVICE, CONTROL SYSTEM, CONTROL METHOD, AND RECORDING MEDIUM WITH CONTROL PROGRAM RECORDED THEREON

This application is a National Stage Entry of PCT/JP2020/014875 filed on Mar. 31, 2020, the contents of all of which are incorporated herein by reference, in their entirety.

TECHNICAL FIELD

The present disclosure relates to a control device or the like that controls a target to be controlled such as a robot.

BACKGROUND ART

In recent years, the introduction of robots has been promoted against the background of a shortage of the labor population and an increase in labor cost. In order for a robot to perform a desired work (task), so-called system integration (SI) is required in which the entire robot system is appropriately designed and an operation of the robot is set.

The SI related to a robot system will be described using a robot system including an articulated (multi-axis) robot arm, a robot hand for grasping (gripping) an object, and an imaging device such as a camera for recognizing a surrounding environment, as an example.

In such a robot system, the robot recognizes the surrounding environment and executes a predetermined task based on information acquired from the imaging device. Specifically, it is a work that the robot system recognizes a target object used in a task with a camera and moves a robot hand connected to a distal end of a robot arm to the target object and grips the target object.

In an example of the robot system described above, when the task of gripping the target object is given, the robot hand at the distal end of the robot arm is moved to a position of the target object. At this time, position information of the target object is acquired by an imaging device such as a camera in a coordinate system unique to the imaging device (hereinafter, referred to as a "camera coordinate system"). The camera coordinate system is, for example, a coordinate system having a position of the camera as an origin. A z axis in the camera coordinate system is, for example, an optical axis direction of the camera.

Meanwhile, the robot hand is generally controlled using a coordinate system unique to the robot (hereinafter, referred to as a "robot coordinate system"). Here, the robot coordinate system is, for example, a coordinate system having a position of the robot as an origin. The robot coordinate system is a coordinate system having a pedestal (base) or the like as an origin in a case of an articulated robot. A z axis in the robot coordinate system is, for example, a vertical direction. A position of each joint in the articulated robot is described in the coordinate system. For example, in a case of a mobile robot, a coordinate system also moves in accordance with a change in a position and orientation thereof (indicating a direction) (hereinafter, expressed as "position and orientation").

A control of the robot based on the information acquired by the camera or the like requires a relationship established between the camera coordinate system and the robot coordinate system. Such a relationship between coordinate systems is generally obtained by an operation called calibration. A relationship between a plurality of coordinate systems can be expressed using a transformation matrix representing transformation into each coordinate system.

A coordinate system transformation method may be a method of obtaining a transformation matrix representing transformation between the camera coordinate system and a world coordinate system and a transformation matrix representing transformation between the robot coordinate system and the world coordinate system, and then transforming position coordinates of the camera coordinate system into position coordinates of the robot coordinate system via the world coordinate system. The coordinate system transformation method is not limited thereto, and for example, there is a method such as hand eye calibration in which the camera coordinate system and the robot coordinate system are directly associated with each other.

The world (global) coordinate system is a coordinate system that defines the entire three-dimensional space. The world coordinate system is, for example, a stationary coordinate system, and an origin is fixed at one position. In the world coordinate system, a position of each joint in the robot arm, a position of the robot hand, and the position of the camera can be expressed with the origin as a reference.

In a method of determining the transformation matrix, first, it is necessary to obtain internal parameters representing a focal length of the camera, a center of the image, a size of the image, a distortion aberration coefficient, and the like, and external parameters representing the position and orientation of the camera. Therefore, typically, the internal parameters and the external parameters are calculated by comparing a planar pattern of a checkerboard with an image captured by the camera using a calibration checkerboard (chessboard) or the like, and obtaining the position and direction of the camera with high accuracy.

Then, the robot hand is moved to a position where an exact position is known in the world coordinate system, and information on the position and orientation of the robot at that time is measured in the robot coordinate system and the world coordinate system, whereby the calibration, that is, the transformation matrix is determined.

As described above, in the SI of the robot system described above, it is essential to have a high degree of expertise and precise tuning at an actual work site. Therefore, an increase in man-hours for the SI is a problem. In other words, shortening of a lead time when introducing the robot system is hindered.

As described above, in a current robot system, man-hours for associating the robot coordinate system with the camera coordinate system, that is, man-hours required for system integration (SI) is a problem, which becomes a barrier when replacing work that has been performed by humans with robots.

In addition to a factor of increasing the SI man-hours as described above, there is actually a factor of further increasing the SI man-hours. For example, examples thereof include an individual error (for example, lens distortion) for each camera, electrical noise, shielding by other objects, and the like. That is, there is a possibility that an uncertain error peculiar to an environment captured by the camera and an uncertain error for each camera are mixed in the image at the time of imaging.

In addition, even in the robot arm and the robot hand, for example, there is a possibility that a mechanically uncertain error, such as a variation between individuals when manufacturing or a change after repair (part replacement or the like), is mixed. Furthermore, in the operation of the robot, the accuracy of a movement to a designated position and an operation when executing a task is important. However, there is an error between an arithmetic value of the position and orientation based on a control (designation) value and a mechanism model, and the position and orientation of an actual machine due to a modeling error of a movable unit such as an actuator and a link, and other rigid units. That is, there is a possibility that an error is mixed with respect to a designated value in the position and orientation after the robot operates. A re-measurement and a correction work caused by these errors become factors of a further increase in man-hours.

In order to solve these problems, PTL 1 describes an articulated robot system. Problems in associating the robot coordinate system with the camera coordinate system are that the operation of measuring the position of the camera and the position of the robot is necessary with high accuracy, and in addition, that an increase in the number of measurements and a decrease in accuracy occur when there is an irregular error such as lens distortion.

In a system described in PTL 1, a sign (marker) attached to a robot is imaged in advance by a camera, position information of the sign is calculated, and a reference table in which a value of the calculated position information is associated with an orientation parameter of the robot is created. Then, when executing a task, the robot moves the robot hand while referring to the reference table.

PTL 2 describes an information processing apparatus, an information processing method, and a calibration system, capable of estimating a mechanical error of a robot arm. The information processing apparatus acquires angle information of each joint for a plurality of orientations (poses) of the robot arm and estimates the mechanical error of the robot arm on the basis of the angle information and mechanism information of the arm.

CITATION LIST

Patent Literature

[PTL 1] WO 2018/043524 A
[PTL 2] WO 2017/169143 A

SUMMARY OF INVENTION

Technical Problem

However, in an error correction method described in PTL 1 described above, by attaching a sign (marker) to a robot and capturing an image of the robot, man-hours for creating a reference table necessary for calibration are generated. In an error correction method described in PTL 2, it is necessary to acquire angle information about a plurality of orientations (poses) in a state where a distal end of the robot arm is fixed. Therefore, the number of man-hours for calibration for associating a robot coordinate system with a camera coordinate system is not reduced.

The present disclosure has been made in view of the above, and an object of the present disclosure is to provide a control device, a control system, a control method, and a control program, which allow for easy calibration.

Solution to Problem

As one aspect of the present disclosure, a control device includes:
a calibration means configured to calculate a parameter representing transformation between a first coordinate system for image information obtained by capturing an image of a target to be controlled and a second coordinate system that defines an operation of the target to be controlled by using position information representing a position of the target to be controlled in the first coordinate system and position information representing a position of the target to be controlled in the second coordinate system; and
a control means configured to calculate the position information of the target to be controlled in the second coordinate system by using image information including the target to be controlled and the calculated parameter, and to control the target to be controlled based on the calculated position information of the target to be controlled.

Further, as another aspect of the present disclosure, a control system includes:
a control device; and
a target to be controlled that is controlled by the control device.

Further, as another aspect of the present disclosure, a control method including:
calculating a parameter representing transformation between a first coordinate system for image information obtained by capturing an image of a target to be controlled and a second coordinate system that defines an operation of the target to be controlled by using position information representing a position of the target to be controlled in the first coordinate system and position information representing a position of the target to be controlled in the second coordinate system;
calculating the position information of the target to be controlled in the second coordinate system by using image information including the target to be controlled and the calculated parameter; and
controlling the target to be controlled based on the calculated position information of the target to be controlled.

Further, as another aspect of the present disclosure, a control program causes a computer to implement:
a process of calculating a parameter representing transformation between a first coordinate system for image information obtained by capturing an image of a target to be controlled and a second coordinate system that defines an operation of the target to be controlled by using position information representing a position of the target to be controlled in the first coordinate system and position information representing a position of the target to be controlled in the second coordinate system;
a process of calculating the position information of the target to be controlled in the second coordinate system by using image information including the target to be controlled and the calculated parameter; and
a process of controlling the target to be controlled based on the calculated position information of the target to be controlled.

Further, the same object is also achieved by a computer-readable recording medium that records relevant programs.

Advantageous Effects of Invention

According to the present disclosure, it is possible to provide a control device, a control system, a control method, and a control program, which allow for easy calibration.

BRIEF DESCRIPTION OF DRAWINGS

FIG. 8 is a schematic diagram illustrating an outline of a configuration of a control device 13 according to a second example embodiment.

FIG. 10 is a flowchart illustrating an operation in a robot system 20 according to the second example embodiment.

FIG. 11 is a conceptual diagram illustrating an example of a configuration of a robot system 25 according to a modification of the second example embodiment.

EXAMPLE EMBODIMENT

Figure 1:
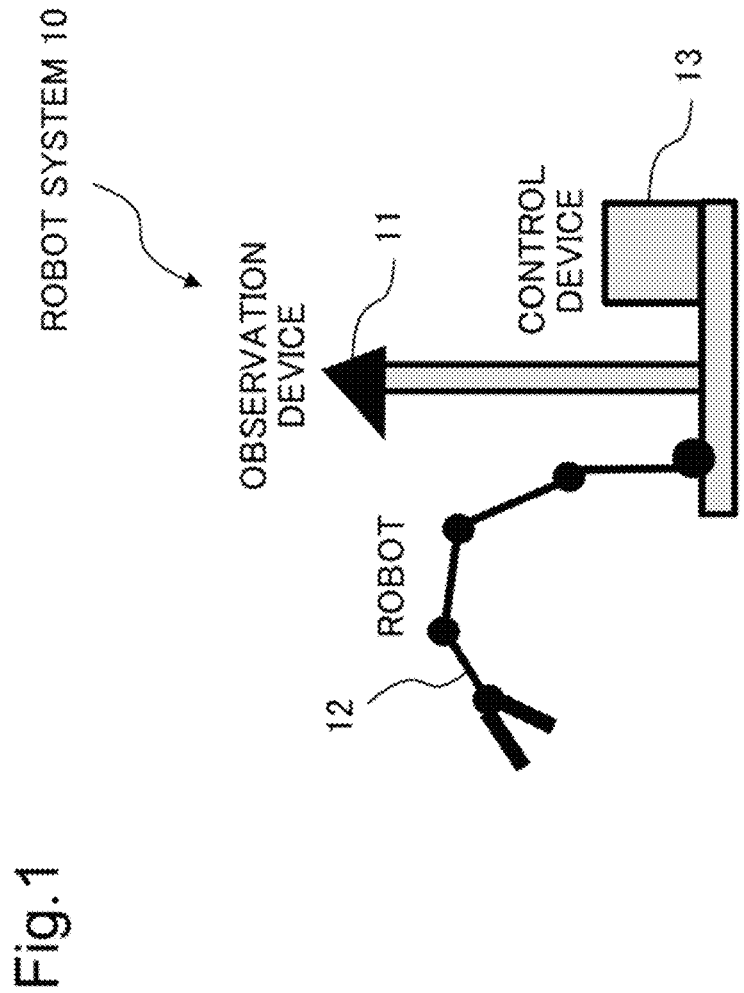
FIG. 1 is a schematic diagram illustrating an outline of a configuration of a robot system 10 according to a first example embodiment.

First, problems to be solved by the present disclosure will be described in detail.

In SI for a robot system, calibration requires many man-hours. The calibration is a process of associating a plurality of coordinate systems (for example, a robot coordinate system and a camera coordinate system) with each other. Furthermore, the man-hours for calibration may increase depending on the robot and an environment around the robot. The man-hours are necessary, for example, when a dedicated sign (marker) or a calibration jig (instrument) is attached to the robot, or when an operation for acquiring data necessary for calibration while changing an orientation (pose) of the robot is set in the robot. The man-hours are also necessary, for example, when data is re-measured or when the measured data is corrected due to an environmental influence such as an observation error or shielding caused by a camera that captures an image, a mechanical error, or a model error.

In the robot system disclosed in PTL 1, for example, a work to attach a sign (marker) to the robot and a work to remove the sign attached to the robot if the sign and the operation of the task interfere with each other are necessary. Further, PTL 1 does not disclose a guideline on how to move the robot. When creating a reference table in which position coordinates of the robot and orientation parameters of the robot are associated with each other, how the robot is moved determines an efficiency of creating the reference table. Therefore, in the robot system, a skilled person creates the reference table while viewing a position of the robot and an angle of a joint. Therefore, in the robot system, the man-hours for these works cannot be reduced.

In an information processing apparatus disclosed in PTL 2, it is necessary to acquire angle information about a plurality of orientations (poses) in a state where a distal end of a robot arm is fixed. Therefore, in a case of the information processing apparatus, an environment and a structure in consideration of fixing the distal end of the robot arm are necessary. PTL 2 does not disclose a method of setting the plurality of orientations (poses). Therefore, a work of appropriately creating the reference table by a skilled person while viewing the orientation (pose) of the robot is generated. Therefore, in the information processing apparatus, such environment construction and work increase man-hours.

Furthermore, in an actual robot system, an association relationship between the plurality of coordinate systems may change due to a physical impact, an electrical defect, or the like generated in the robot system after the calibration is completed. In such a case, recalibration is necessary. Recalibration requires very large man-hours, such as stopping a task of the robot, reattaching a marker, remeasuring, and the like.

The inventor has found relevant problems and has derived a means for solving the problems. The inventor has found that calibration can be performed without requiring a sign (marker) or a calibration jig and without setting an operation of the robot manually. Furthermore, even in a case where recalibration is necessary, the recalibration can be automatically executed without manual intervention, and a calibrated state can be always maintained. Hereinafter, example embodiments capable of solving such a problem will be described in detail with reference to the drawings.

Hereinafter, aspects for carrying out the present disclosure will be described with reference to the drawings. However, the example embodiments described below have technically preferable limitations for carrying out the present disclosure but the scope of the disclosure is not limited to the following. In all the drawings used in the following description of the example embodiment, the same reference numerals are given to the same parts unless otherwise specified. In the following example embodiments, repeated descriptions of similar configurations and operations may be omitted. In addition, the directions of the arrows in the drawings illustrate examples and do not limit the directions of signals between the components.

First Example Embodiment

First, a robot system 10 according to a first example embodiment of the present disclosure will be described with reference to the drawings.

(System Configuration)

A configuration of the robot system 10 will be described with reference to FIG. 1. FIG. 1 is a schematic diagram illustrating an outline of a configuration of the robot system 10 according to the first example embodiment.

The robot system 10 includes an observation device 11, a robot 12, and a control device 13.

The observation device 11 observes a work space of the robot 12, and outputs observation information in which an observation result is represented in accordance with a camera coordinate system or an image coordinate system. In the present example embodiment, the observation coordinate system determined for each observation device 11 is referred to as the camera coordinate system for the convenience of description. The observation coordinate system (or camera coordinate system) is a coordinate system with the observation device 11 as an origin. However, the observation device 11 is, for example, a camera, but is not limited to the camera. The camera coordinate system is used in a case where the observation device 11 is a depth camera, a device that optically measures a distance to an object, for example, a light detection and ranging (Lidar), or a device that measures radio waves, for example, a radio detection and ranging (Radar).

The image coordinate system is used in a case where the observation device 11 is a camera that acquires an object as image data, for example, a device such as a monocular, a compound eye, a monochrome, RGB, and a video camera. The image coordinate system is, for example, a coordinate system having an upper left corner of the acquired image as an origin. A specific configuration of the observation device 11 is not limited in the present example embodiment.

The observation information is image data captured by the observation device 11 and distance data determined on the basis of the characteristics of the observation device 11. The distance data is, for example, a distance from an observation point to a measurement target obtained by optical measurement or radio wave measurement. The type of the data, the temporal measurement cycle, the resolution, and the like are not limited in the present example embodiment.

The robot 12 receives a control plan represented in the robot coordinate system from outside and operates according to the control plan. The control plan (also referred to as control input) represents, for example, a control value input to a controller such as an actuator in such a way that the controller is in a desired state (rotation angle or torque).

The robot 12 outputs control information represented in the robot coordinate system. The control information is information output from the controller, that is, a control value obtained by monitoring a rotation angle, torque, or the like of the controller.

Figure 2:
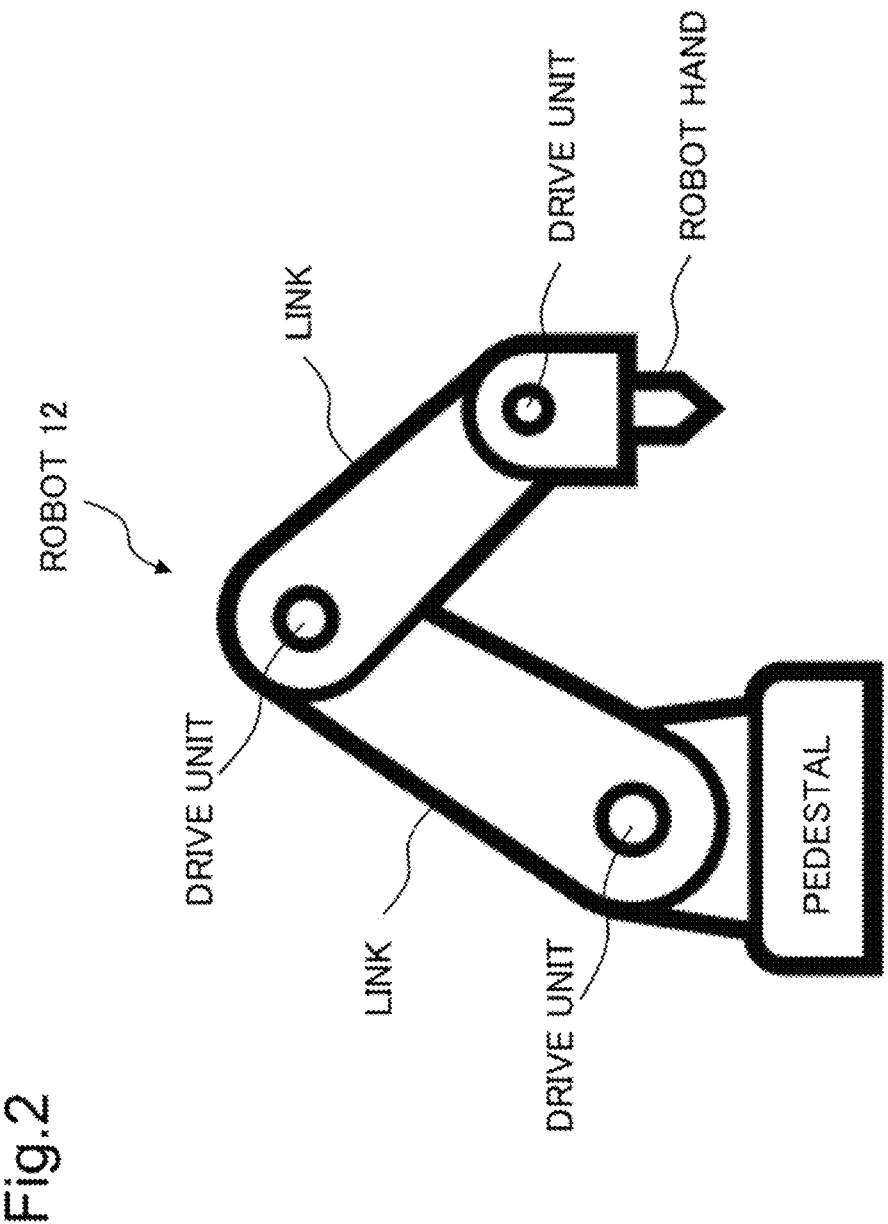
FIG. 2 is a schematic diagram illustrating a configuration of a robot 12 according to the first example embodiment.

FIG. 2 is a schematic diagram illustrating an example of a configuration of the robot 12 according to the first example embodiment. As illustrated in FIG. 2, the robot 12 includes a pedestal (base) for fixing the robot 12, an articulated arm to which a plurality of links are connected, a robot hand connected to a distal end of the arm, and a drive unit (actuator). Any mechanism (end effector) can be attached to the robot hand according to an execution task. In addition, configurations such as the number of joints and the length of links of the robot, and the type and number of robots are not particularly limited in the present specification.

In the present example embodiment, the control plan and the control information are represented in the robot coordinate system, but may be represented in another coordinate system such as a world coordinate system, for example.

The control device 13 receives observation information represented in the camera coordinate system or the image coordinate system from the observation device 11. The control device 13 receives control information represented in the robot coordinate system from the robot 12. Then, the control device 13 executes calibration for associating the camera coordinate system (or the image coordinate system) with the robot coordinate system. Thus, the robot 12 can perform tasks in a calibrated environment.

In the present example embodiment, the robot 12 may receive a control plan representing the operation of the robot 12 from an external control planning device (not illustrated). Alternatively, the robot 12 may generate the control plan.

(Device Configuration)

Figure 3:
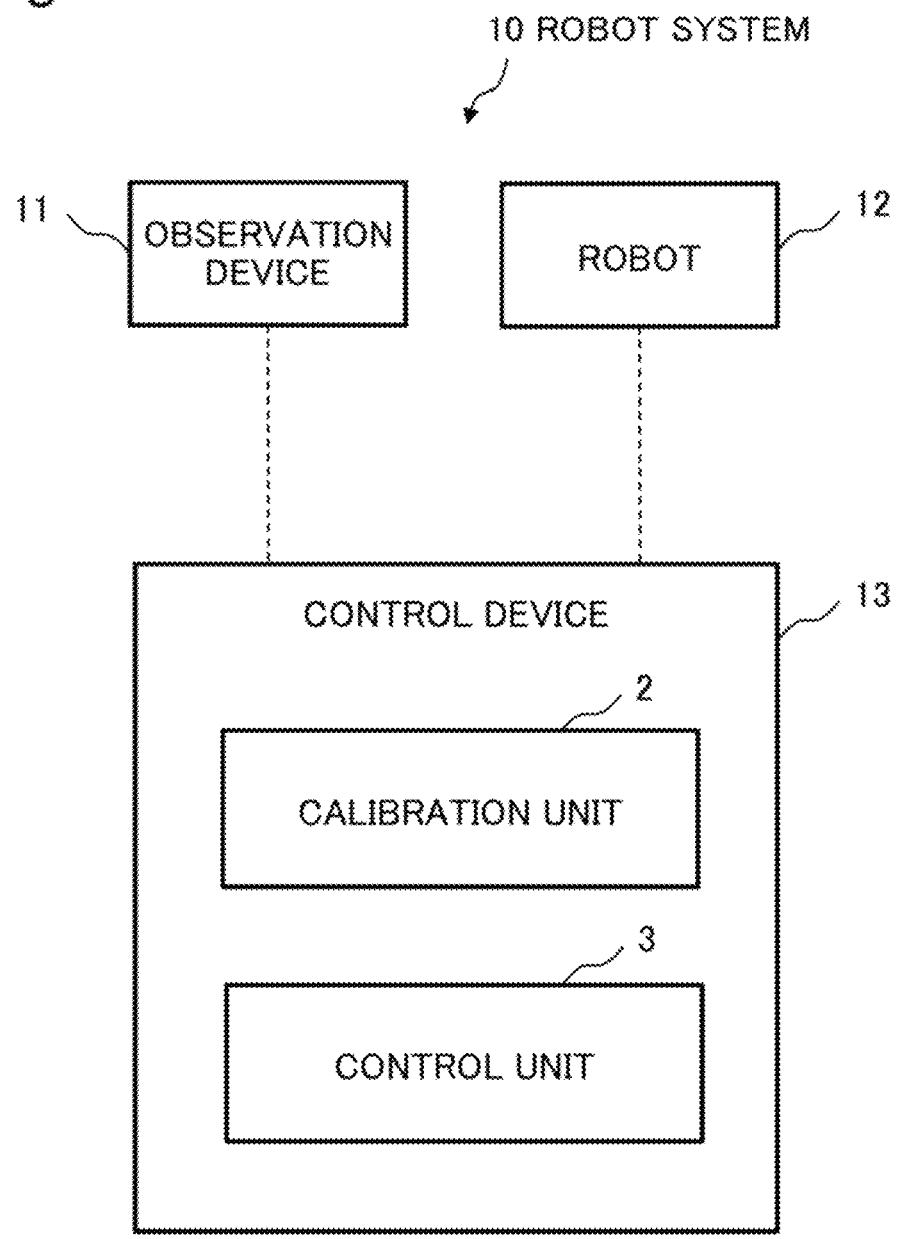
FIG. 3 is a block diagram illustrating an outline of the robot system 10 according to the first example embodiment.

FIG. 3 is a block diagram illustrating an outline of the robot system 10 according to the first example embodiment. As illustrated in FIG. 3, the control device 13 includes a calibration unit 2 that calibrates the robot 12 that is a target to be controlled, and a control unit 3 that controls the robot in a calibrated state.

Figure 4:
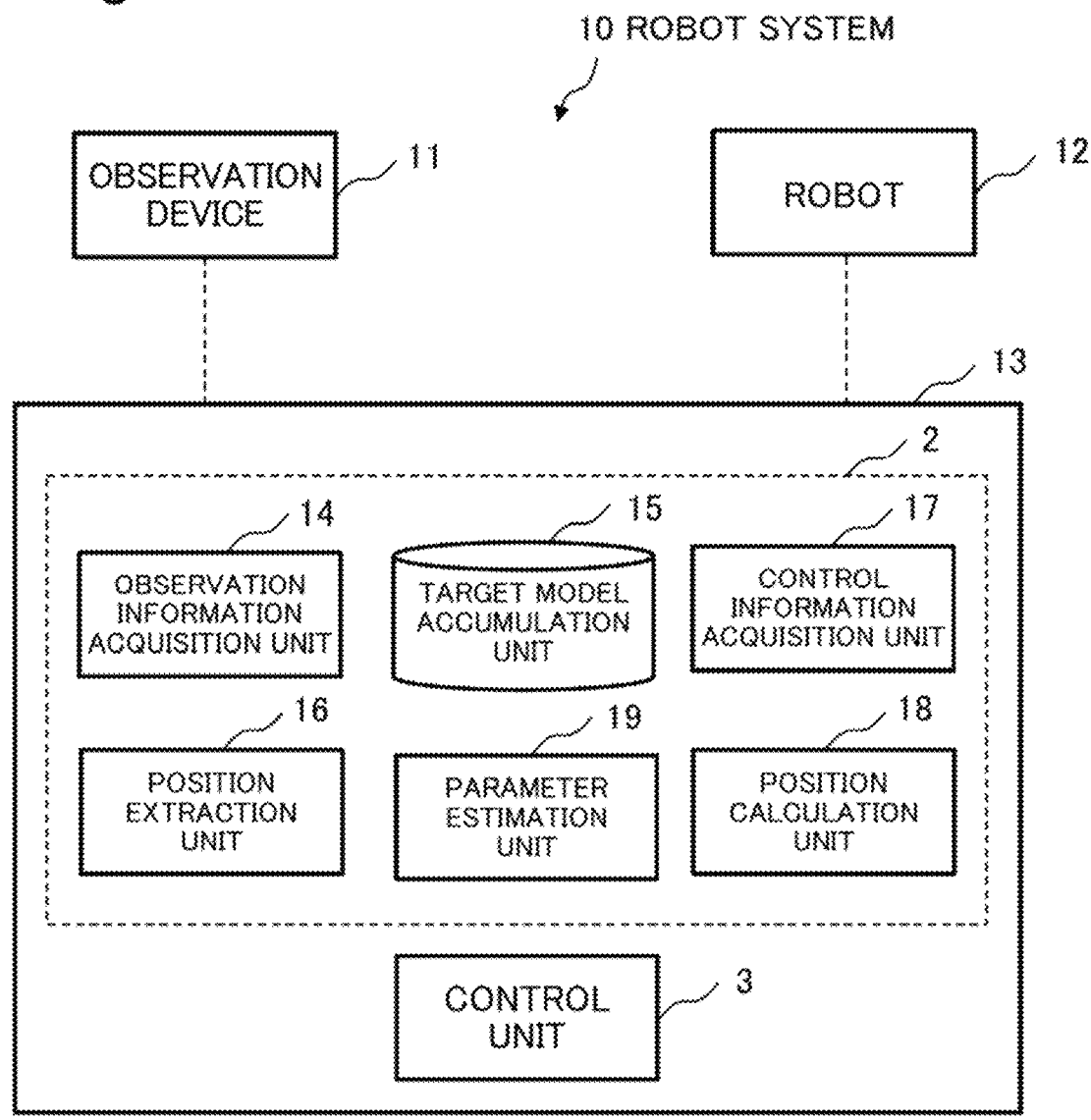
FIG. 4 is a block diagram illustrating an example of a configuration of a control device 13 of the robot system 10 according to the first example embodiment.

A configuration of the control device 13 of the robot system 10 according to the first example embodiment will be described more specifically with reference to FIG. 4. FIG. 4 is a block diagram illustrating an example of the configuration of the control device 13 of the robot system 10.

The calibration unit 2 of the control device 13 includes an observation information acquisition unit 14, a target model accumulation unit 15, a position extraction unit 16, a control information acquisition unit 17, a position calculation unit 18, and a parameter estimation unit 19.

The control device 13 executes calibration for associating the camera coordinate system or the image coordinate system with the robot coordinate system on the basis of image information represented in the camera coordinate system or the image coordinate system and the control information represented in the robot coordinate system. Hereinafter, details of calibration will be described on the assumption that the observation device 11 is a device that acquires a target as image data and outputs image information as observation information, that is, the observation information is an image represented in the image coordinate system. However, the observation information may be in either the image coordinate system or the camera coordinate system.

The observation information acquisition unit 14 acquires the observation information represented in the image coordinate system output from the observation device 11. The observation information to be acquired is determined on the basis of the characteristics of each observation device 11, for example, internal parameters. Therefore, the detailed specification of the observation information is not limited in the present example embodiment. The observation information acquisition unit 14 outputs the acquired observation information to the position extraction unit 16.

The target model accumulation unit 15 accumulates model data on a robot that is a target to be controlled, i.e., the robot 12 in the present example embodiment. The model data includes at least the following two types of data.

The first is data such as a computer aided design (CAD) model regarding the appearance of the target robot 12, which is referred to as representation model data. Specifically, the first represents data representing a shape of the robot 12, data representing features of a surface, such as patterns, colors, textures, and the like. However, the representation model data may not include a sign (marker) or a calibration jig. This means that it is not necessary to add a dedicated sign or the like to the robot. Here, the shape and features of the surface of the robot 12 are illustrated as examples, but the present disclosure is not limited thereto.

The second is model data (represented as "mechanism model data") representing mechanism of the target robot 12. In the present example embodiment, the mechanism model data includes geometric parameters of the robot 12 and forward kinematics (FK) parameters.

The geometric parameters indicate, for example, the shape and size of each part of the robot 12. In addition, the forward kinematics parameter is, for example, a parameter that determines a relationship between a state at a first time and a state at a second time in a process of obtaining position and orientation of the robot arm or the robot hand from a displacement (rotation, linear movement, or the like) of each joint. Specifically, there are the number of joints (shaft, joint), the length of links, the arrangement of links (serial/parallel), and the like, but the present disclosure is not limited thereto.

Since both the representation model data and the mechanism model data are represented by an actual size of the robot 12 (or enlargement, reduction, and rotation thereof), the representation model data and the mechanism mode data do not depend on the coordinate system.

The position extraction unit 16 inputs the observation information acquired by the observation information acquisition unit 14 and the representation model data stored in the target model accumulation unit 15. The representation model data represents model data of the target robot 12. The position extraction unit 16 extracts a position of the robot 12 (hereinafter, expressed as "extracted position") from the observation information on the basis of the representation data model.

The position of the robot 12 can be extracted, for example, by matching the robot 12 included in the observation information (for example, an image) with the representation model data of the robot 12. The detection of the robot 12 in the observation information can be achieved by applying deep learning, particularly, a technology of classifying (segmenting) an image using a convolutional neural network (CNN) or a deep neural network (DNN) and separating a region (position) of the robot 12 from other regions. Alternatively, the detection of the robot 12 can also be achieved by applying motion capture for detecting motion or a technology of detecting an orientation (pose) and detecting a region (position) of the robot 12.

When the observation information is a moving image or time-series 3D data, the position of the robot 12 associated to the motion of the robot in the control plan can be extracted by further using the control information of the robot 12 acquired by the control information acquisition unit 17 in addition to the observation information. For example, the position can be extracted on the basis of similarity or correlation between motion information (optical flow) between adjacent frames in a moving image or time-series data, and control information regarding the robot 12. According to this method, the position of the robot 12 can be extracted even in a case where an object other than the robot 12 is included in the observation information, and it is difficult to separate the robot 12 from another region or the robot 12 is shielded. Since the extraction of the position of the robot 12 uses a relative relationship, the coordinate system may be different. These extraction methods are not limited to extracting a target from an image, and can also be applied to extracting a target from observation information other than an image as described above.

As described above, in the present example embodiment, the method of extracting the position and orientation of the robot 12 is not limited. The position extraction unit 16 executes a process of extracting the position of the robot 12 on the basis of the observation information. The position of the robot 12 may be extracted using the mechanism model data instead of the representation model data of the robot 12. The reason is that since the mechanism model data includes the geometric parameters, the position extraction unit 16 can extract the position of the robot 12 by the same method as the representation model data. According to the position extraction unit 16 according to the present example embodiment, it is not essential to attach a sign (marker) to the target robot 12 to be used for motion capture or the like.

The control information acquisition unit 17 acquires control information output from a controller (actuator, etc., but not illustrated) that controls the operation of the robot 12. Details, formats, acquisition frequencies, and the like of the control information are not particularly limited. Control information similar to a displacement (rotation, angle, or the like) of the controller configuring each articulated (multi-axis/multi-link) may be sequentially obtained. The control information acquisition unit 17 outputs the acquired control information to the position calculation unit 18.

The position calculation unit 18 calculates the position of the robot 12 (hereinafter, expressed as "calculated position") based on the control information input from the control information acquisition unit 17 and the mechanism model data stored in the target model accumulation unit 15. Here, in order to calculate the calculated position of the robot 12, the position and orientation (direction of movement) of the robot 12 are required. This is because the position of the robot 12 is calculated on the basis of the movement amount of the robot 12 and the direction thereof since forward kinematics is used. The position calculation unit 18 outputs the calculated position to the parameter estimation unit 19.

Specifically, the calculation of the calculated position of the robot 12 can be achieved by representing the position and orientation of each part such as a joint or a link of the robot 12 in the robot coordinate system with a reference point (for example, a pedestal (base)) representing the position of the robot 12 as an origin, and applying forward kinematics (FK) to the position and orientation.

The extracted position of the robot 12 output from the position extraction unit 16 and the calculated position of the robot 12 output from the position calculation unit 18 are input to the parameter estimation unit 19. The extracted position is, for example, a position represented in the image coordinate system. The calculated position is a position represented in the robot coordinate system using mechanism model data or the like.

The parameter estimation unit 19 can also create a distribution of positions by adding a disturbance term representing an error or system noise to each of the input calculated positions. Such a distribution may be hereinafter referred to as a probability distribution.

The parameter estimation unit 19 can also calculate a relationship between the calculated position and the parameter with respect to the extracted position by using, for example, machine learning such as a neural network or a support vector machine (SVM). For example, the parameter estimation unit 19 inputs training data using the calculated position and the extracted position or a difference therebetween as explanatory variables, and the transformation parameter as an objective variable, and creates a model representing a relationship using the input training data.

In the process of creating the model, for example, a parameter (an example of a transformation parameter) in the model in a case where the likelihood increases (alternatively, in a case where the likelihood is maximum) is calculated with a conditional probability that a certain extracted position appears when a certain calculated position appears as the likelihood.

Alternatively, the parameter estimation unit 19 may calculate the transformation parameter in a case where a difference (error) between the extracted position and the calculated position becomes small (alternatively, in a case where the difference is minimum) according to the least squares method. Here, the transformation parameter is a parameter that associates the coordinate system of the extracted position with the coordinate system of the calculated position.

A process of calculating the transformation parameter by the parameter estimation unit 19 is not limited to the above-described example.

Next, an operation of the first example embodiment will be described.

Figure 5:
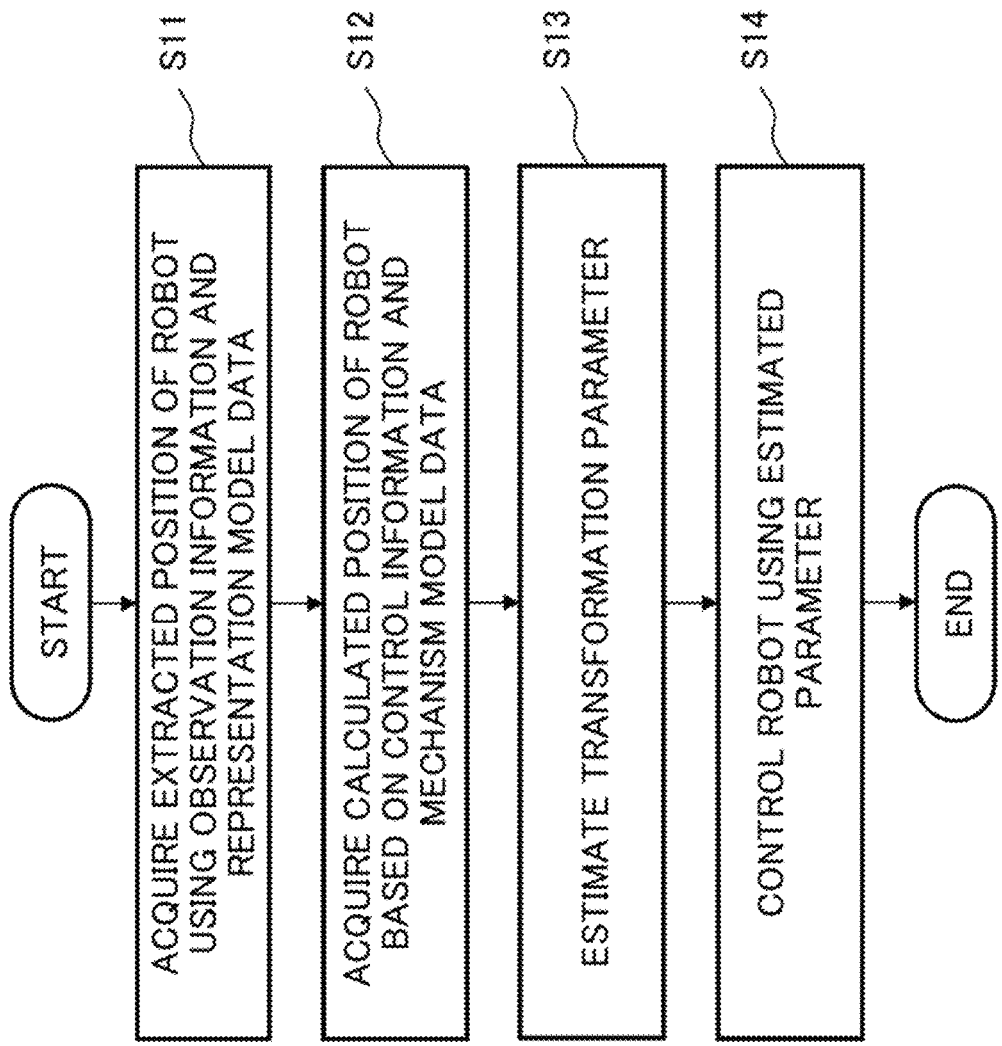
FIG. 5 is a flowchart illustrating a process of estimating a transformation parameter in the first example embodiment.

First, an operation in the control device 13 will be described. FIG. 5 is a flowchart illustrating a process of estimating the transformation parameter in the first example embodiment. The process of estimating the transformation parameter is performed, for example, when executing the calibration according to an instruction from an operator before the operator of the robot 12 activates the robot 12 and instructs the robot 12 to perform a predetermined operation.

The position extraction unit 16 extracts the position of the robot 12 in the observation information using the observation information acquired by the observation information acquisition unit 14 from the observation device 11 and the representation model data of the target model accumulation unit 15, and acquires the extracted position (step S11). For example, the position extraction unit 16 may acquire the extracted position by matching the observation information with the representation model data. A process of acquiring the extracted position is not limited to the above-described example.

The extracted position output from the position extraction unit 16 can be expressed by using, for example, a set including position information indicating the position of each part of the robot 12 based on the image information, and position information of a feature point (characteristic point) indicating a characteristic point on the robot or a feature amount (feature value) indicating a feature on the image, such as a boundary (edge) between the robot and the background, a pattern, or a texture, included in the observation information output from the observation device 11, or can be expressed by using position information expressed by point cloud data, occupancy information of a three-dimensional dimensional lattice (grid), or the like in a case of three-dimensional data. The extracted position (for example, position information or a set of position information) is, for example, information represented in the image coordinate system in the observation device 11.

The position calculation unit 18 calculates the actual position of the robot 12 using forward kinematics based on the control information acquired from the robot 12 by the control information acquisition unit 17 and the mechanism model data of the target model accumulation unit 15, and acquires the calculated position (step S12).

The calculated position output from the position calculation unit 18 can be expressed using position information indicating the position of each part of the robot 12 and position information of a feature point indicating a characteristic point on the robot or a feature amount indicating a feature on the image, such as a boundary (edge) between the robot and the background, a pattern, or a texture, on the basis of control information of a controller of the robot 12. The calculated position (for example, position information) is information represented in the robot coordinate system.

Here, these two types of position information are information obtained from different information sources (sources). In other words, these two types of position information are different in terms of whether the information indicates the position of the robot 12 in the image coordinate system or the information indicates the position of the robot 12 in the robot coordinate system. That is, the extracted position and the calculated position input to the parameter estimation unit 19 are information representing one event or one position except for a difference in a coordinate system.

The parameter estimation unit 19 uses the calculated position and the extracted position to estimate a parameter θ of a matrix h representing the association relationship of the coordinate system regarding the calculated position and the extracted position (step S13). Step S13 will be described later in detail with reference to FIG. 5.

Figure 6:
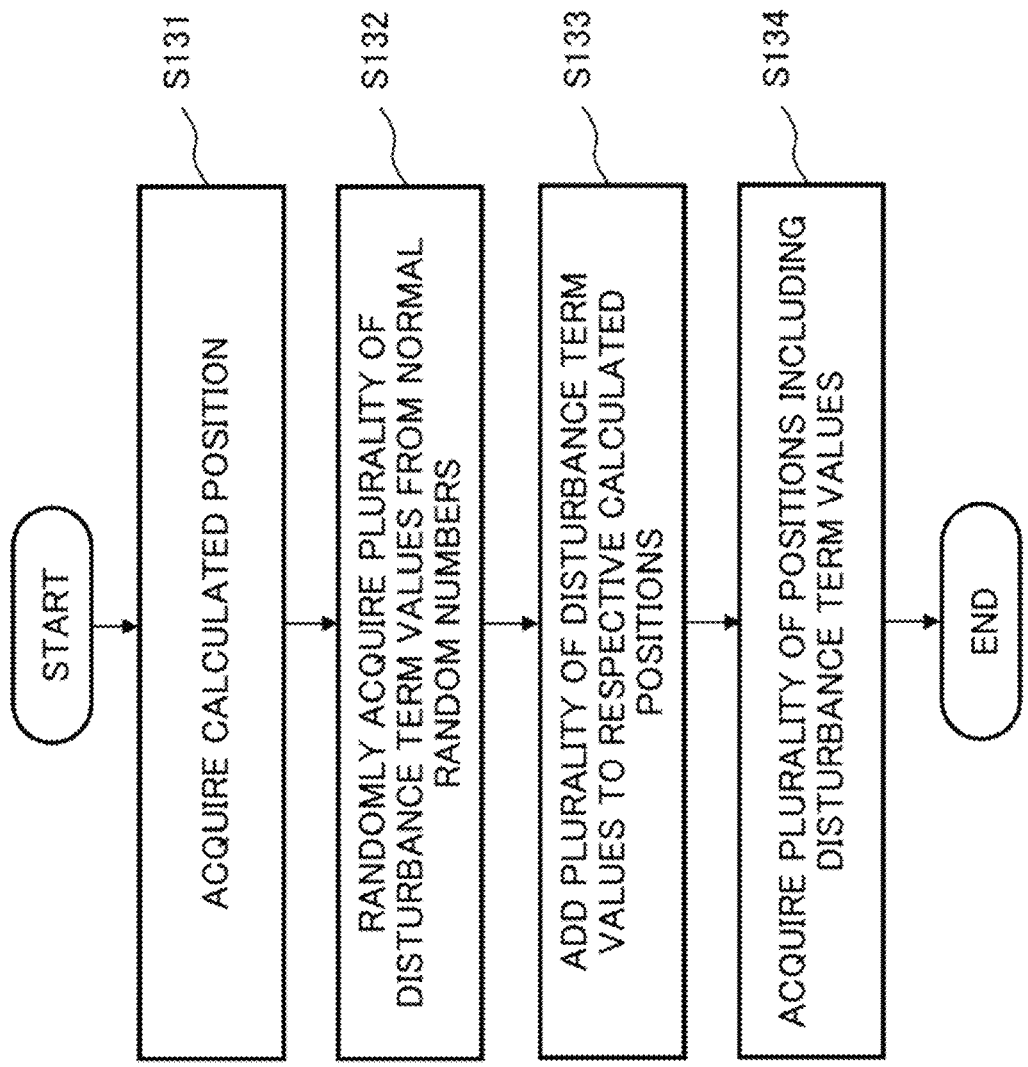
FIG. 6 is a flowchart illustrating an example of a process (step S13) of transforming a calculated position into a probability distribution in the first example embodiment.
Figure 7:
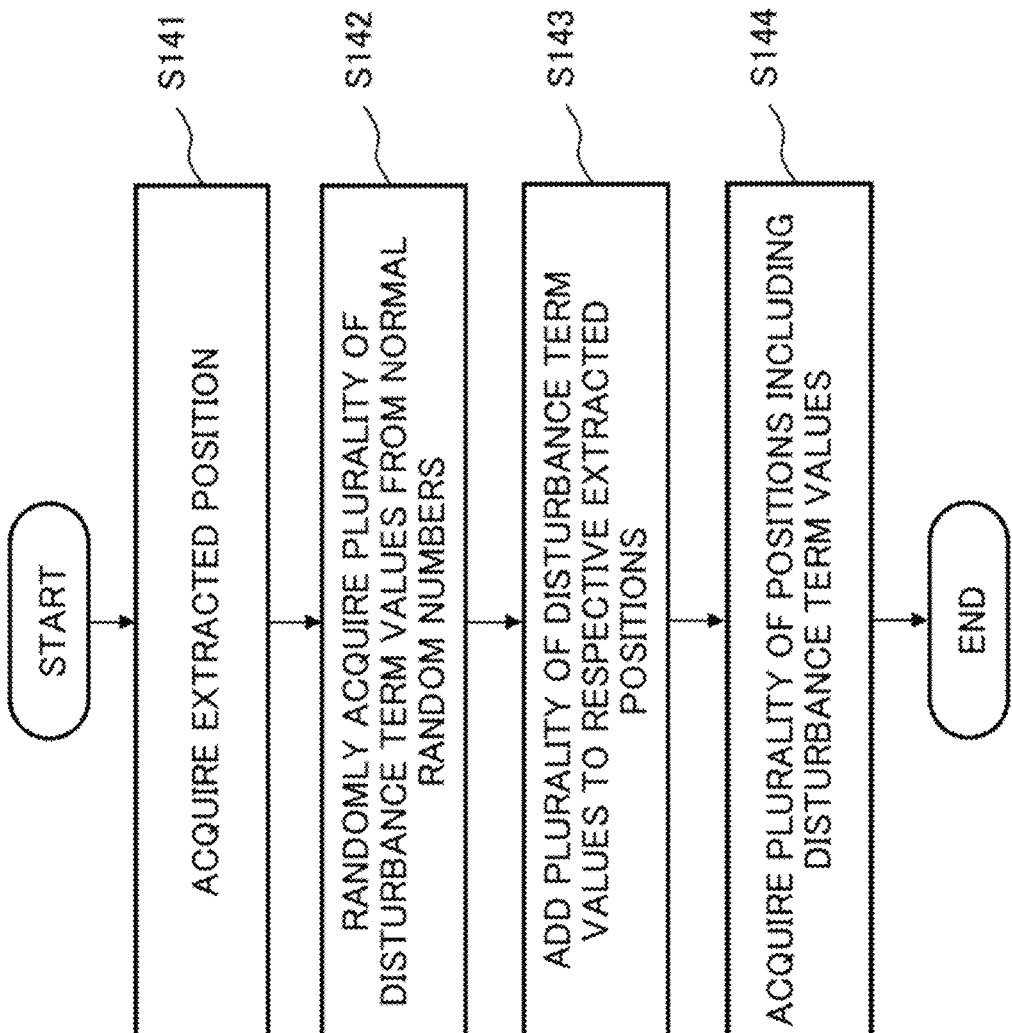
FIG. 7 is a flowchart illustrating an example of a process (step S13) of transforming an extracted position into a probability distribution in the first example embodiment.

A process of calculating a distribution may be executed between step S12 and step S13. The process will be described with reference to FIGS. 6 and 7. FIG. 6 is a flowchart illustrating details of a process of calculating a distribution of the calculated positions. FIG. 7 is a flowchart illustrating details of a process of calculating a distribution of the extracted positions.

The parameter estimation unit 19 adds a value representing noise to the calculated position calculated by the position calculation unit 18 on the basis of Expression 1 described later. The noise is, for example, one value randomly extracted from a normal distribution having an average of 0 and a variance of $\mu$ ($\mu > 0$). The parameter estimation unit 19 performs a process of adding such noise to the calculated position a plurality of times. In other words, it can also be said that the parameter estimation unit 19 executes a process of creating, for example, a distribution according to a normal distribution from the calculated positions. The parameter estimation unit 19 transforms the calculated position by the processing exemplified in Expression 2 described later. Specifically, the parameter estimation unit 19 transforms the calculated position into a value corresponding to the extracted position that depends on the parameter.

In the following description, for the convenience of description, t ($t \geq 0$) represents time. It is assumed that i (i is a positive integer) represents position information indicating the position of each part of the robot, a feature point indicating a characteristic point on the robot, or a feature amount indicating a feature on the image, such as a boundary (edge) between the robot and the background, a pattern, or a texture. An extracted position (position information) output from the position extraction unit 16 at a certain time t or a certain frame t of time-series observation data is set as $y_t$. For example, it is assumed that "time t=0" represents the time at which the operation of the robot is started. In this case, it can also be said that the time t represents an elapsed time from the start of the operation. Similarly, the calculated position (position information) output from the position calculation unit 18 at a certain time t is set as $x_t$. In this case, a calculated position $x_t$ is information represented in the robot coordinate system. An extracted position $y_t$ is information represented in the image coordinate system.

In addition, the calculated position $x_t$ and the extracted position $y_t$ may be vectors having a plurality of elements. The calculated position $x_t$ can also be expressed as $x_{i,t}$, where a suffix for identifying each part of the robot 12, the above-described feature point or feature amount is i (i is an integer of 1 or more and equal to or less than n, where n is the number of parts or feature points). Similarly, a region (each part) extracted from an image captured at time t can be expressed as $y_{i,t}$. $y_{i,t}$ may be a vector having the plurality of elements.

Referring to FIG. 6, the parameter estimation unit 19 acquires a calculated position $x_{i,t}$ expressed in the robot coordinate system from the position calculation unit 18 (step S131). The parameter estimation unit 19 randomly acquires a plurality of values of the disturbance term from the normal random number (step S132).

The mechanism model data for the robot 12 is expressed as a function f. It is assumed that a result of the control value included in the control information acquired by the control information acquisition unit 17 is represented as $u_t$. In this case, when a calculated position at a certain time "t−1" is a position $x_{i,t-1}$, the position $x_{i,t}$ at the time t is calculated according to the processing illustrated in f ($x_{i,t-1}$, $u_t$). Considering an uncertainty (error) of the calculated position $x_{i,t}$ at the time t, the calculated position $x_{i,t}$ can be expressed as, for example, Expression 1 shown below.

[Mathematical Formula 1]

$$x'_{i,t} = f(x_{i,t-1}, u_t) + \beta \quad \text{(Expression 1)}$$

Expression 1 calculates a so-called time evolution problem, that is, a value at the time t of a position $x'_{i,t}$ on the basis of a value before the time t of a calculated position $x_{i,t-1}$. The function f may be linear or non-linear. In addition, although the result of the control value $u_t$ is a variable of the function f, these notations are examples. In addition, β is a disturbance term (system noise) representing the uncertainty of the calculated position $x_{i,t}$.

The position $x'_{i,t}$ is represented using the calculated position $x_{i,t-1}$, but may be represented using a calculated position at a plurality of times before the time (t−1). That is, the position $x'_{i,t}$ may be represented using a calculated position at k (where k≥2) time before the time t. The position $x'_{i,t}$ may be calculated using a calculated position at at least one time before the time t.

As the calculated position $x_{i,t}$, a value obtained by the robot repeating the operation a plurality of times may be used. In consideration of the error as expressed by Expression 1, the calculated position does not become one value due to the randomly sampled disturbance term β, and in this case, the calculated position $x_{i,t}$ can be treated as a distribution.

The disturbance term β represents a disturbance (allowable noise value) given to cause a deterministic variable to consider an uncertainty, that is, to be treated as a probability. This uncertainty represents an error included in the mechanism model data representing the mechanism of the robot 12 and a result value of the control value, such as an error of the function f (that is, the geometric parameters and forward kinematic parameters of the robot 12) of the mechanism model data for the robot 12.

The disturbance term β may be, for example, a random number. For example, a normal random number can be used as the random number for the disturbance term β. That is, the parameter estimation unit 19 acquires m (where m is a natural number) normal random numbers (random numbers according to the normal distribution) as values of the disturbance term β.

The parameter estimation unit 19 adds each of the values of the m disturbance terms β to each of the calculated positions $x_{i,t}$ ($x_{1,t}$, $x_{2,t}$, . . . $x_{n,t}$) (step S133). Then, the parameter estimation unit 19 acquires m positions $x'_{i,t}$ for each part (step S134). In addition, the parameter estimation unit 19 may acquire m values of the disturbance term β for each part and acquire m positions $x'_{i,t}$ for each part. The m positions $x'_{i,t}$ following the acquired normal distribution can be regarded as a probability distribution p ($x'_{i,t}$).

Here, in a case where a normal distribution is used, the normal distribution may be appropriately determined. For example, in the normal distribution, first, a standard deviation (or variance) may be increased, and the standard deviation (or variance) may be gradually decreased as the data is accumulated. Alternatively, the normal distribution may be a predetermined standard deviation (or variance) based on past data.

Referring to FIG. 7, the parameter estimation unit 19 acquires an extracted position $y_{i,t}$ represented in the image coordinate system from the position extraction unit 16 (step S141). The parameter estimation unit 19 randomly acquires the plurality of values of the disturbance term from the normal random number (step S142).

Here, $x_{i,t}$ representing the calculated position and $y_{i,t}$ representing the extracted position are positions representing the robot position at the time t. $x_{i,t}$ representing the calculated position and $y_{i,t}$ representing the extracted position represent one piece of information except for a difference in data properties such as resolution (number of pieces of data) and a difference in the coordinate system.

Therefore, when a function or matrix representing a relationship between the calculated position $x_{i,t}$ and the extracted position $y_{i,t}$ is h (matrix h), the function or matrix h can also be said to be information representing an association relationship of data in each coordinate system. In the matrix h, a parameter representing an association relationship of the coordinate system is θ. Then, the extracted position $y_{i,t}$ can be expressed as h ($x_{i,t}$, θ). Considering an uncertainty of the extracted position $y_{i,t}$ at the time t, the extracted position $y_{i,t}$ can be expressed as, for example, Expression 2 shown below.

[Mathematical Formula 2]

$$y'_{i,t} = h(x_{i,t}, \theta) + w \quad \text{(Expression 2)}$$

Here, w is a disturbance term (observation noise) representing an uncertainty of a position $y'_{i,t}$ of a region extracted at a region (a position of each part, a feature point indicating a characteristic point on the robot, or a feature amount indicating a feature on the image such as a boundary (edge) between the robot and the background, a pattern, or a texture) i and the time t. This disturbance term w represents an uncertainty for deterministic variables. Similarly to the disturbance term β, the disturbance term w is given to a deterministic variable to represent a disturbance (noise allowed, width of distribution) for treating the deterministic variable as a probability. The uncertainty includes at least one of a physical and electrical error and noise in the observation device 11, an error when the position extraction unit 16 extracts the position of each part of the robot 12, an expression error of a function (matrix) h associating differences in the properties of resolution (number of pieces of data) with each other, and the like.

The disturbance term w may be a value sampled from a normal random number. For example, the parameter estimation unit 19 acquires m (where m is a natural number) values of the disturbance term w sampled from the normal random number (random number according to the normal distribution).

The parameter estimation unit 19 obtains positions obtained by transforming each of the calculated positions $x_{i,t}$ ($x_{1,t}$, $x_{2,t}$, . . . $x_{n,t}$) according to transformation processing h. The parameter estimation unit 19 adds the m values of the disturbance terms w to the position to which the transformation processing h is applied for each part of the calculated position $x_{i,t}$ (step S143). With this processing, the parameter estimation unit 19 acquires m for each part represented in the image coordinate system (step S144). The m positions $y'_{i,t}$ following the acquired normal distribution can be regarded as a probability distribution p ($y'_{i,t}$).

Next, a process of estimating the parameter θ in step S13 will be described in detail with reference to FIG. 5. FIG. 5 is a flowchart illustrating a process of estimating the transformation parameter in the first example embodiment. The parameter θ representing the association relationship of the coordinate system represents, for example, an element of a rotation matrix representing rotation, an element of a translation matrix representing a parallel movement, or a combination thereof. In the present example embodiment, a value of θ is an estimated value. That is, by obtaining the value of θ, for example, an association relationship between the robot coordinate system and the image coordinate system can be obtained.

The process of estimating the parameter θ in the model (step S13) is, for example, a process of obtaining a value in a case where the conditional probability (i.e., the likelihood) $p(y'_{i,t}|x'_{i,t})$ regarding the probability distribution $p(x'_{i,t})$ for the position $x'_{i,t}$ represented in the robot coordinate system and the position $y'_{i,t}$ represented in the image coordinate system increases.

The more similar a distribution obtained by transforming $p(x'_{i,t})$ is to a distribution of $p(y'_{i,t})$, the higher the likelihood is. The less similar the distribution obtained by transforming $p(x'_{i,t})$ is to a distribution of $p(y_{i,t})$, the lower the likelihood is. Therefore, the higher the likelihood, the higher the quality of the association relationship (represented by a function, a matrix, or the like) h. The lower the likelihood, the lower the quality of the association relationship (represented by a function, a matrix, or the like) h.

In other words, in the present example embodiment, the likelihood defined as described above depends on the parameter θ representing the association relationship. That is, the likelihood is a function of θ (hereinafter, expressed as a "function L (θ)"). In this case, the optimum function (matrix) h is determined by a process of obtaining θ* in a case where the likelihood is maximum, as illustrated in Expression 3.

[Mathematical Formula 3]

$$\theta^* = \arg_\theta \max L(\theta) \quad \text{(Expression 3)}$$

In other words, the optimum parameter θ* is determined by a process of obtaining θ in a case where the probability distribution $p(x'_{i,t})$ is most likely. The process shown in Expression 3 can be achieved by, for example, a process of updating θ in such a way that the likelihood becomes higher. In other words, it can also be said that the process illustrated in Expression 3 is, for example, a process of obtaining θ in a case where the likelihood is higher.

By using the parameter θ* obtained by executing the process according to Expression 3 for the matrix h, a position of the robot coordinate system and a position of the image coordinate system can be optimally associated with each other including the error of each other. That is, by executing the process according to Expression 3, calibration can be achieved in the robot system.

In the calculation of the likelihood for the probability distribution to which the disturbance term (system and observation noise) as described above is added, a Kalman filter may be used in a case where normality of the distribution or linearity of the function f and the function (matrix) h is assumed. In addition, in a case where the above-described linearity is not assumed, a particle filter or the like may be used for the calculation. The calculation method based on the likelihood described above is merely an example, and for example, a Kullback-Leibler information amount (KL divergence) for evaluating a distance between probability distributions can be used as the likelihood. However, the above calculation method is an example, and is not limited in the present example embodiment.

As a method of calculating the parameter θ*, for example, an exploratory method, that is, a method of maximizing the likelihood (conditional probability) can also be applied. The parameter θ* can be obtained by searching for a value that minimizes the difference obtained as a result of transformation with the parameter as an unknown. In the calculation method, for example, a gradient method such as a steepest descent method using a gradient of likelihood or difference with respect to a parameter, a Monte Carlo-based method such as a particle filter (Monte Carlo filter) or Markov chain Monte Carlo methods (MCMC), or Bayesian optimization using Gaussian process regression or the like can be considered. In another calculation method, the distance can be estimated to be small in a framework of approximate Bayesian computation (ABC) using a distance value.

In calculating the parameter θ*, the resolution, a search range, a search step width, and the like of the position information in each coordinate system can be changed stepwisely. For example, by performing rough estimation from a wide search range with low resolution at first and then performing dense estimation from a narrow search range with high resolution, it is possible to perform accurate estimation in a short time even in a case where a deviation between initial coordinates is large. In particular, the above-described ABC method can be achieved by performing estimation while changing a threshold value of the distance stepwisely.

Finally, referring to FIG. 5, the control unit 3 uses the estimated parameter θ to match the position of the robot 12 in the image information with the position of the robot 12 in the control information, in which the coordinate systems are different, thereby precisely controlling the robot 12 in a space in the image information (step S14).

According to the process according to the present example embodiment, there is also an effect that a part of the robot can be used as a sign (marker) by using the extracted position measured in the image coordinate system and the calculated position measured in the robot coordinate system. The extracted position measured in the image coordinate system is calculated, for example, by performing matching processing of the position extraction unit 16 on the observation information acquired by the observation information acquisition unit 14 and the representation model data stored in the target model accumulation unit 15. The calculated position measured in the robot coordinate system is calculated by the position calculation unit 18 based on the control information acquired by the control information acquisition unit 17 and the mechanism model data stored in the target model accumulation unit 15.

In other words, the process according to the present example embodiment is a process of collating similarities between a position (extracted position) extracted on the basis of information about sensing or an image recognition from outside of the robot and a position (calculated position) calculated on the basis of information inside the robot. Therefore, according to the process, there is an effect that the calibration of the robot system can be easily performed without necessarily using a sign (marker). Therefore, according to the process according to the present example embodiment, the man-hours involved in attaching the sign are eliminated, and it is possible to avoid interrupting the task for attaching the sign.

Furthermore, the process according to the present example embodiment can be performed even in an environment having roughly two types of uncertainty as follows by expressing the position by a distribution.

The first is an error caused by geometric parameters and mechanism model data of the robot, an error of a function representing time evolution, and an error included in a result value of a control value such as a displacement (rotation, linear movement, and the like) of each joint.

The second is a physical and electrical error and noise in the observation device, an error when the position and orientation of the robot are extracted, an expression error of a function (matrix) associating a difference in data properties, and the like. These errors include mechanical errors between the mechanism model data of the robot and the actual machine described in the related art.

The above two types of uncertainty cannot be ignored in a real system.

The process according to the present example embodiment is a process of probabilistically estimating the transformation parameter by probabilistically representing the position represented in a plurality of coordinate systems using a probability statistics method as described above in consideration of each of these two types of errors. According to such a process, the use of special measurement means such as a jig or the like, difficulty depending on an environment of the site, and additional SI man-hours such as the appropriate setting of the robot operation manually are reduced. According to the process according to the present example embodiment, it is possible to accurately estimate the parameter that determines the relationship between the robot coordinate system and the image coordinate system by calculating the distribution based on each position from a small amount of data, that is, at least one set including calculated positions and extracted positions.

In the present example embodiment, the transformation between the position measured in the image coordinate system and the position measured in the robot coordinate system is used, but the present disclosure is not limited thereto. For example, the transformation between the position measured in the world coordinate system and the position measured in the robot coordinate system may be used. Alternatively, the position measured in the world coordinate system may be used for transformation between the position measured in the image coordinate system and the position measured in the robot coordinate system. Alternatively, the transformation between the position measured in the camera coordinate system and the position measured in the robot coordinate system may be used.

As described above, the robot system of the present example embodiment can easily achieve calibration between different coordinate systems by estimating the transformation parameter that matches the positions of the robot calculated by different means such as observation and control using the robot itself as a sign. Furthermore, the robot system of the present example embodiment can probabilistically estimate the transformation parameter by probabilistically expressing each position in consideration of an error in a real system.

Second Example Embodiment

Next, a robot system 20 according to a second example embodiment of the present disclosure will be described with reference to the drawings. FIG. 8 is a schematic diagram illustrating an outline of a configuration of the control device 13 according to the second example embodiment. The robot system 20 according to the second example embodiment of the present disclosure is different from the robot system 10 according to the first example embodiment in that a coordinate transformation unit 101 is included in the calibration unit 2 of the control device 13. The robot system 20 according to the second example embodiment includes an imaging device 21 corresponding to the observation device 11 in the first example embodiment, an image information acquisition unit 100 corresponding to the observation information acquisition unit 14 in the first example embodiment, and a comparison unit 102 and a correction unit 103 corresponding to the functions of the parameter estimation unit 19 in the first example embodiment.

In the second example embodiment, parts similar to those in the first example embodiment are denoted by the same reference numerals, the description thereof is omitted, and only different parts will be described. An application target of the robot system of the present example embodiment is not limited to this example. For example, the present disclosure can be applied to any system as long as the system includes an observation device such as a camera or a sensor that requires calibration and a mechanism that operates on the basis of control information.

In the present example embodiment, the robot system 20 will be described as transforming between the camera coordinate system and the world coordinate system. In the world coordinate system of the present example embodiment, it is assumed that the origin coincides with the pedestal that is the origin of the robot coordinate system.

The imaging device 21 captures an image of the work space of the robot 12 and outputs image information represented in the camera coordinate system. The imaging device 21 is, for example, a camera (including monocular, compound eye, monochrome, RGB, depth camera, and the like), a video camera, or the like. The imaging device 21 corresponds to the observation device 11 that acquires image information in the first example embodiment and is not particularly limited as long as it is a device that can acquire an image. The image information may be a still image or a moving image.

The image information acquisition unit 100 of the calibration unit 2 acquires the image information output from the imaging device 21. As described above, regarding the image information, the type, frequency, and the like of the information are not particularly limited. The image information acquisition unit 100 outputs the acquired image information to the coordinate transformation unit 101.

The coordinate transformation unit 101 of the calibration unit 2 acquires the image information output from the image information acquisition unit 100. The coordinate transformation unit 101 transforms the coordinates of the image information using a predetermined transformation matrix. The coordinate transformation unit 101 outputs the coordinate-transformed image information to the position extraction unit 16.

The transformation of the coordinate system will be specifically described. First, the transformation processing between the image coordinate system and the camera coordinate system will be described. In the transformation processing between these coordinate systems, internal parameters and external parameters are roughly used. The internal parameters are a focal length of a camera, a center of an image captured by the camera, a size of the image, a distortion aberration coefficient, and the like. The external parameter is the position and orientation, or the like of the camera.

The internal parameter represents a relationship between a point on the image and camera coordinates around the camera. For example, when the focal length is ($f_x$, $f_y$), an optical center (principal point) is ($c_x$, $c_y$), and a shear coefficient is s, the internal parameter can be expressed in a matrix (described as K) form as illustrated in Expression 4.

[Mathematical Formula 4]

$$K = \begin{bmatrix} f_s & 0 & c_x & 0 \\ s & f_y & c_y & 0 \\ 0 & 0 & 1 & 0 \end{bmatrix} \quad \text{(Expression 4)}$$

The notation of the matrix K is an example and is not limited to this example. Using the K matrix exemplified in Expression 4, a relationship between the points on the image, that is, the point ($x_{image}$, $y_{image}$) measured in the image coordinate system and the point ($x_{camera}$, $y_{camera}$, $z_{camera}$) measured in the camera coordinate system can be expressed as Expression 5.

[Mathematical Formula 5]

$$w \begin{bmatrix} x_{image} \\ y_{image} \\ 1 \end{bmatrix} = K \begin{bmatrix} x_{camera} \\ y_{camera} \\ z_{camera} \\ 1 \end{bmatrix} \quad \text{(Expression 5)}$$

w represents a $z_{camera}$ with a scale factor. Here, the coordinate system is represented by using a homogeneous coordinate system, but is not limited thereto.

Next, the transformation processing between the world coordinate system and the camera coordinate system will be described. A relationship between the point ($x_{world}$, $y_{world}$, $z_{world}$) measured in the world coordinate system and the point ($x_{camera}$, $y_{camera}$, $z_{camera}$) measured in the camera coordinate system can be expressed by Expression 6.

[Mathematical Formula 6]

$$\begin{bmatrix} x_{camera} \\ y_{camera} \\ z_{camera} \\ 1 \end{bmatrix} =$$

$$R \begin{bmatrix} x_{world} \\ y_{world} \\ z_{world} \\ 1 \end{bmatrix} + t_w = \begin{bmatrix} r_{1,1} & r_{1,2} & r_{1,3} & t_x \\ r_{2,3} & r_{2,2} & r_{2,3} & t_y \\ r_{3,1} & r_{3,2} & r_{3,3} & t_z \\ 0 & 0 & 0 & 1 \end{bmatrix} \begin{bmatrix} x_{world} \\ y_{world} \\ z_{world} \\ 1 \end{bmatrix} \equiv C \begin{bmatrix} x_{world} \\ y_{world} \\ z_{world} \\ 1 \end{bmatrix} \quad \text{(Expression 6)}$$

The point ($x_{camera}$, $y_{camera}$, $z_{camera}$) measured in the camera coordinate system can be calculated using, for example, the point ($x_{world}$, $y_{world}$, $z_{world}$) measured in the world coordinate system, a rotation matrix R, and a translation matrix $t_w$. In Expression 6, $r_{ij}$ (i and j are integers from 1 to 3) represents each component of the rotation matrix R, and $t_k$ (k=x, y, z) represents each component of the translation matrix. In addition, in Expression 6, the rotation matrix R and the translation matrix $t_k$, that is, the external parameters are defined as a matrix C.

Using Expressions 5 and 6, a relationship between the point ($x_{image}$, $y_{image}$) measured in the image coordinate system and the point ($x_{world}$, $y_{world}$, $z_{world}$) measured in the world coordinate system can be expressed as Expression 7.

[Mathematical Formula 7]

$$\begin{bmatrix} x_{image} \\ y_{image} \\ 1 \end{bmatrix} = \quad \text{(Expression 7)}$$

$$\frac{1}{w} \begin{bmatrix} f_s & 0 & c_x & 0 \\ s & f_y & c_y & 0 \\ 0 & 0 & 1 & 0 \end{bmatrix} \begin{bmatrix} r_{1,1} & r_{1,2} & r_{1,3} & t_x \\ r_{2,3} & r_{2,2} & r_{2,3} & t_y \\ r_{3,1} & r_{3,2} & r_{3,3} & t_z \\ 0 & 0 & 0 & 1 \end{bmatrix} \begin{bmatrix} x_{world} \\ y_{world} \\ z_{world} \\ 1 \end{bmatrix} \equiv P \begin{bmatrix} x_{world} \\ y_{world} \\ z_{world} \\ 1 \end{bmatrix}$$

In Expression 7, a matrix representing a product of a reciprocal of the scale factor w, the matrix K as an internal parameter, and the matrix C as an external parameter is defined as P.

In the above description, it is described that the image information acquired by the image information acquisition unit 100 can be transformed into the world coordinate system regardless of whether the image information is represented in the image coordinate system or in the camera coordinate system. However, the transformation from the image coordinate system into the camera coordinate system, that is, the matrix K is often set as a parameter of the device at the time of shipment. In particular, since the setting is often completed in a composite camera such as a 3D (depth) camera, hereinafter, the present disclosure focuses on the transformation from the camera coordinate system into the world coordinate system, that is, the matrix represented by Expression 6, with the camera matrix K given.

That is, in the present example embodiment, the coordinate transformation unit 101 transforms the coordinate system of the image information acquired from the image information acquisition unit 100 on the basis of the matrix C indicating a transformation relationship from the camera coordinate system to the world coordinate system expressed by Expression 6. In the first example embodiment, a relationship between the pedestal as a starting point and the world coordinates is assumed to be known, but is not limited thereto. This is because, for example, in a case where there is an error in this relationship, the error can be included in a coordinate transformation of the camera coordinate system, that is, the transformation matrix C.

The comparison unit 102 compares the calculated position with the extracted position and outputs comparison information that is a result of the comparison. Here, the comparison information is information generated from one state of the robot 12. That is, the calculated position and the extracted position are the same type of information, and can be expressed in alignment with information of the same dimension. In this case, a difference between pieces of data represented by these pieces of information can be calculated. For example, when each piece of information is represented by two-dimensional data, the difference between the pieces of data can be calculated as a distance between the pixels. When each piece of information is represented by three-dimensional point cloud data, the difference between the pieces of data can be calculated as a distance between the point clouds. The comparison unit 102 calculates the calculated difference by such processing. The comparison method and the difference as the comparison information described above are merely examples and are not limited thereto.

If there is no error between the calculated position and the extracted position, the calculated position and the extracted position coincide with each other, and the difference is 0. The difference may be a total value of the differences of the captured portions (parts) of the robot 12. However, the calculated position and the extracted position actually include an error, noise, and the like. Therefore, the difference between the calculated position and the extracted position is not 0.

Figure 9A:
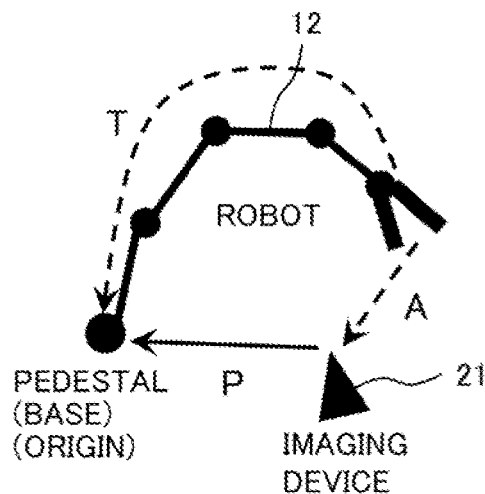
FIG. 9 is a schematic diagram for illustrating a difference in the second example embodiment.
Figure 9B:
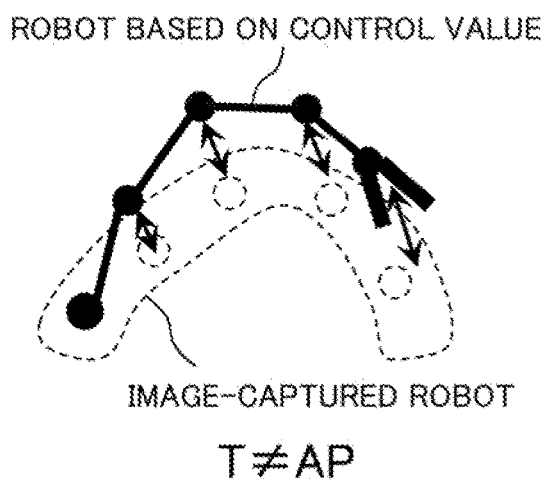
Figure 9C:
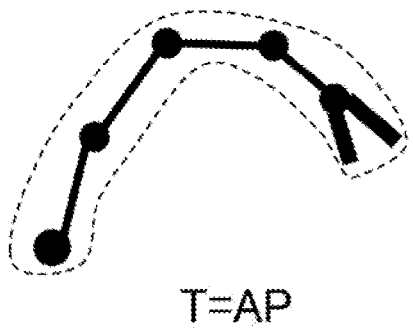

Here, the difference will be described with reference to FIG. 9. FIG. 9 is a schematic diagram for illustrating a difference in the second example embodiment. In the present example embodiment, as described above, it is assumed that the origin of the robot coordinate system coincides with the origin of the world coordinate system. That is, in the present example embodiment, the position of the camera coordinate system is transformed into the position of the robot coordinate system by transforming the position of the camera coordinate system into the world coordinate system.

In FIG. 9(*a*), the robot 12 represents the positions of the joints and the links based on the control values and the mechanism model data by black circles and solid lines, and draws the captured image information, that is, the image of the robot 12 separately in such a way as to be surrounded by a dotted line.

FIG. 9(*a*) illustrates a configuration of these devices and a transformation matrix that defines coordinates of each device. First, the image information captured by the imaging device 21 is associated with the origin of the world coordinates by the transformation matrix P expressed by Expression 7. Next, the camera coordinate system in which the image information is captured and the robot 12 in the image information are associated with each other by a transformation matrix A. This relationship is estimated by the position extraction unit 16. Originally, different matrices are associated to regions or points of the captured image, but in FIG. 9, the matrices are represented as the matrix A for simplification.

Further, the pedestal (base) as a reference of the robot 12 coincides with the origin of the world coordinate system. Finally, the positions of the joints and links of the robot 12 with respect to the pedestal are associated by a transformation matrix T. The transformation matrix T originally is associated to each joint, but in FIG. 9, the transformation matrix T is represented as a representative for simplification.

Next, FIG. 9(*b*) will be described. FIG. 9(*b*) is a diagram schematically illustrating an example of image information captured by the imaging device 21. FIG. 9(*b*) illustrates a state in which there is a difference between a value output from the position extraction unit 16, i.e., the image of the robot 12 and a value output from the position calculation unit 18, i.e., the position of the robot 12 based on the control value. As is clear from FIG. 9(*b*), the positions of the robot 12 based on the control values represented by the black circle and the solid line and the image-captured robot 12 surrounded by the dotted line are shifted. In such a state, a relationship between the transformation matrices described above is T≠AP as illustrated. That is, a relationship based on the control value of the robot 12 on the left side and the mechanism model data does not match a relationship based on the image information on the right side. Therefore, as illustrated in the drawing, since a positional relationship therebetween does not coincide with each other, a deviation appears on the image information. In the image-captured robot 12, the position of the joint to be originally present is schematically represented by a dotted circle, and a difference from the black circle indicating the position based on the control value is described by an arrow. This arrow is an example of the difference and it is possible to quantitatively obtain a difference of the entire robot 12 by adding all the arrows for each joint. In the example of the image information in FIG. 9, the image information is schematically drawn assuming a two-dimensional image, but is not limited thereto, and the difference can be similarly calculated even for three-dimensional point cloud data or the like as described above. In addition, since a method of calculating the difference can include not only the difference between the joints but also the difference between the links, and the like, a specific method of calculating the difference is not limited in the present example embodiment.

Furthermore, as another expression example of the difference, the difference can be expressed by a ratio of three-dimensional point cloud data of the image-captured robot included in a space (volume) occupied by the robot calculated from the positions of the joints and links based on the control values and the parameters representing a structure of the robot accumulated in the target model accumulation unit 15, for example, the outer diameter of the part. The more the three-dimensional point group data of the image-captured robot included in the space occupied by the robot, the smaller the difference, and the less the point group data included, the larger the difference. This represents a degree of overlap between the robot based on the control value and the image-captured robot illustrated in FIG. 9(*b*). By using such an index, it is also possible to calculate the difference by counting the point cloud data without directly calculating the distance.

Next, FIG. 9(*c*) will be described. FIG. 9(*c*) is a diagram schematically illustrating an example of image information captured by the imaging device 21. In contrast to FIG. 9(*b*), there is no difference. As is clear from the drawing, the positions of the robot 12 based on the control values represented by the black circle and the solid line and the position of the image-captured robot 12 surrounded by the dotted line coincide with each other. In such a state, the relationship of the transformation matrix described above is T=AP as illustrated in the drawing. That is, a relationship based on the control value on the left side and the mechanism model coincides with a relationship based on the image information on the right side. In general, a state without such a difference can be said to be a state in which the robot system is ideally calibrated.

The correction unit 103 (illustrated in FIG. 8) inputs the comparison information (i.e., the difference) output by the comparison unit 102, adjusts a value of each transformation matrix, and outputs a value of the transformation matrix when the comparison information becomes small as a correction value. This adjustment method, that is, a method of obtaining the correction value will be described later.

The correction of the transformation matrix by the correction unit 103 and the calculation of the difference by the comparison unit 102 by adopting the transformation matrix are repeated, for example, until the difference becomes smaller than a certain threshold value, and thus a transformation matrix with a small difference can be obtained. That is, the state with the difference illustrated in FIG. 9(*b*) can be brought closer to the state having no difference illustrated in FIG. 9(*c*). The threshold value may be set and corrected by calculating a value of the repetitive difference, or may be determined on the basis of a past result value or the like, and is not particularly limited.

Since the matrix K, which is the internal parameter described in Expression 4, is determined for each individual of the imaging device 21 as described above, an appropriate value can be obtained in advance. Therefore, the correction value may be determined in such a way that the above-described difference approaches 0 using the rotation matrix R and the translation matrix $t_k$ with respect to the world coordinates of the imaging device 21 expressed by Expression 6. Here, in Expression 6, a rotation is represented in the form of a general rotation matrix, but the rotation can be represented by rotation for each axis at a minimum, that is, three degrees of freedom (roll, pitch, yaw). However, since this expression depends on the order of the rotation, it is desirable to express the rotation by a 9-element rotation matrix as shown in Expression 6 or four elements of quaternion. On the other hand, since the degree of freedom of the translation is a movement in each axial direction, the degree of freedom of the translation is three-dimensional. Therefore, at a minimum, a total of six variables of three degrees of freedom of the rotation and three degrees of freedom of the translation may be determined. Alternatively, 7 or 12 variables are obtained in consideration of the rotation order. Hereinafter, an example of this obtaining method will be described. However, this method is merely an example, and is not limited thereto.

For the process of obtaining the variable, for example, a method of obtaining the variable can be applied in such a way that the difference between the position transformed from the camera coordinate system to the world coordinate system and the position of the robot coordinate system is reduced. In general, a problem for determining N variables (degrees of freedom) of a transformation matrix for associating an input with an output is called a perspective-n-point problem (PnP) problem, and N variables can be obtained analytically by solving equations for N known input/output pairs. Even if the number of equations is insufficient, the indefiniteness remains, but the equations can be solved in principle. The N known input/output pairs can be made, for example, based on the relationship for each joint illustrated in FIG. 2. That is, the equation is made assuming that the coordinates representing the joint on the image and the coordinates of the joint based on the control value match. However, since the coordinates do not match at this point in time, for example, a transformation matrix may be obtained by a so-called iteration method in which the transformation matrix is obtained by applying a disturbance to the coordinates on the image, and the transformation matrix is repeated while changing the disturbance until a difference (i.e., an error that is a difference between an actual value and a calculated value) obtained as a result of the transformation is minimized.

Alternatively, similarly to the method exemplified in the first example embodiment, a value at which the difference is minimized can be searched for. For example, a Monte Carlo-based method such as a particle filter (Monte Carlo filter) or MCMC can be applied.

The configuration of the robot system 20 of the present example embodiment is described above. Next, the operation of the robot system 20 of the present example embodiment will be described with reference to the drawings.
(Operation)

FIG. 10 is a flowchart illustrating an operation in the robot system 20 according to the present example embodiment. In the description along the flowchart of FIG. 10, the robot system 20 will be described as a main body of the operation.

First, the robot system 20 acquires image information in such a way that at least a part of the target robot 12 enters the field of view of the imaging device 21, and transforms coordinates by a predetermined transformation matrix (step S101). Here, the image information is transformed from the image coordinate system into the world coordinate system (robot coordinate system) using a matrix P represented by Expression 7. Since the external parameter (matrix C) of the matrix P is the estimated value, a prescribed value (any initial value) is used in the first transformation (step S101). An imaging method only needs to be able to acquire image information on at least a portion configuring the robot 12, and the others are not limited.

Next, the robot system 20 inputs the coordinate-transformed image information and the representation model data on the robot 12 to the position extraction unit 16, and acquires the extracted position of the robot 12 (step 102).

Next, the robot system 20 acquires control information from the robot 12 (step S103). The acquisition of the control information only needs to include at least a portion where the image information on the robot 12 is acquired, and the others are not limited.

Next, the robot system 20 inputs the control information and the mechanism model data on the robot 12 to the position calculation unit 18, and acquires the calculated position of the robot 12 (step S104).

Next, the robot system 20 inputs the calculated position and the extracted position of the robot 12 to the comparison unit 102, and causes the comparison unit 102 to compare the calculated position with the extracted position. The robot system 20 causes the comparison unit 102 to output the quantified difference as the comparison result (step S105). As the difference, for example, it is possible to use a difference in respective pieces of position information of specific portions configuring the robot 12, specifically, a distance between pixels on a two-dimensional image or a distance between three-dimensional point groups, but the difference is not limited thereto.

Finally, the robot system 20 determines whether the difference output from the comparison unit 102 is less than the threshold value (step S106). If the difference is less than the threshold value (step S106/YES), the robot system 20 ends the processing. That is, it is determined that the coordinate transformation (step S101) executed at this time is correct, and the transformation matrix is used as it is in the transformed coordinate unit 101. On the other hand, when the difference is equal to or more than the threshold value (step S106/NO), the robot system 20 inputs the output of the comparison unit 102 to the correction unit 103. In the correction unit 103, a new parameter θ that is a correction value is calculated, and the correction value is applied to the transformation matrix of the coordinate transformation unit 101 (step S107). The correction value of the transformation matrix is calculated in such a way that the difference becomes small. Then, the robot system 20 repeats step S106.

In the above, in the present example embodiment, an example of obtaining the external parameter (matrix C) that is the estimated value in the present example embodiment without considering the uncertainty (error) as in the first example embodiment is described. Next, an example of probabilistically obtaining the parameter will be described. One is a case where a Monte Carlo-based method such as a particle filter (Monte Carlo filter) or MCMC is used as the above-described exploratory estimation method. In these cases, it is assumed that a disturbance term representing uncertainty is included in the transformation by the external parameter (matrix C) expressed by Expressions 6 and 7 as in Expression 2, and the difference is expressed by likelihood, which makes it possible to perform estimation in which the uncertainty (error) of the calculated position and the extracted position is included as the distribution of the parameters. For example, assuming that a disturbance term is sampled from a normal distribution with a variance $\sigma^2$, a non-negative function that calculates a difference (distance)

between a vector $X_{image}$ representing the extracted position obtained in the image coordinate system and a vector $X_{world}$ representing the calculated position obtained in the world coordinate system (robot coordinate system) is defined as d, and an estimated value (at least six variables as described above) included in the external parameter (matrix C) to be estimated is defined as θ, and it is expressed as

[Mathematical Formula 8]

$$\sum_i d\left([X]_{image}^{(j)}, C(\theta)[X]_{world}^{(i)}\right) \quad \text{(Expression 8)}$$

Therefore, the likelihood can be expressed in such a way as to be

[Mathematical Formula 9]

$$L(\theta) = \frac{1}{\sqrt{2\pi\sigma^2}} \exp\left[-\frac{\sum_i d\left([X]_{image}^{(i)}, C(\theta)[X]_{world}^{(i)}\right)^2}{2\sigma^2}\right] \quad \text{(Expression 9)}$$

The superscript (i) represents the (i)-th part (i is an integer). Similarly to Expression 3 of the first example embodiment, probabilistic estimation considering uncertainty can be performed by searching for the parameter θ in such a way as to maximize the likelihood. The matrix C(θ) represents the external parameter of Expression 6, and is transformed into image coordinates by acting on the vector $X_{world}$ representing the calculated position obtained in the world coordinate system (robot coordinate system). Although the difference is calculated in accordance with the image coordinate system here, the difference may be calculated in the world coordinate system (robot coordinate system) using an inverse matrix $C^{-1}$ of the matrix C.

As another method, in a case where the likelihood cannot be obtained assuming that the error is represented by a normal distribution as in Expression 9, the estimation can be performed by a framework of approximate Bayesian computation (ABC) using only the value of the difference (distance) of Expression 8. In ABC, similarly to the method described above, a parameter candidate that is an estimated value is sampled using a particle filter (Monte Carlo filter), MCMC, or the like, and a parameter value when a distance (difference) obtained by Expression 8 is less than a threshold value ε,

[Mathematical Formula 10]

$$p(\theta) = p\left(\theta \middle| \sum_i d\left([X]_{image}^{(i)}, C(\theta)[X]_{world}^{(j)}\right) < \varepsilon\right) \quad \text{(Expression 10)}$$

can be obtained. p(θ) represents a posterior probability (posterior distribution) satisfying a condition that the distance (difference) d is less than the threshold value ε. These methods are examples, and the present disclosure is not limited thereto.

The operation of the robot system 20 along the flowchart of FIG. 10 is described above. This operation can be executed in parallel with an original task given by the robot system 20. This is because an installation of a sign (marker) on the robot 12, manual setting of the position and orientation, and the like are unnecessary, and thus it is not necessary to interrupt the task. That is, by continuing this operation, it is possible to always maintain a state in which the robot coordinate system and the camera coordinate system are associated with each other, that is, a state in which the robot system 20 is calibrated.

As an application destination of the present example embodiment, a system including an imaging device such as a camera and a robot arm is conceivable. In particular, there is usage in which the imaging device acquires position information such as a target object and place and performs a specific task with a robot arm, typically, a series of operations called pick and place in which an object at a specific position is picked up, transferred to a specified position, and lowered to the specified position, and an operation called palletize/de-palletize, in which packed products are loaded on a pallet or unloaded from the pallet. These are examples and are not limited as application targets.

As described above, in the related art, it is necessary to attach a sign (marker) to the robot or manually acquire angle information about a plurality of orientations (poses) in advance. Therefore, it is not possible to perform an operation of associating the robot coordinate system with the camera coordinate system, that is, calibration in parallel with the given original task. Therefore, as a result, in the related art, it is a problem that the number of man-hours of system integration (SI) increases. The robot system of the present example embodiment can overcome this problem by the following features.

The feature of the present example embodiment is that by using the robot itself as the sign (marker), it is possible to eliminate the man-hours related to the attachment of the sign, which is a problem, and to avoid a state in which the task has to be interrupted for the attachment. A method of using the robot itself as a sign can be achieved by comparing the same type of information calculated by different means, that is, the position of the robot itself obtained from the imaging device, that is, the image information, and the position of the robot itself based on the control value of the robot and the mechanism model data. The present example embodiment has invented this solution by combining the image recognition technology and the control technology. Thus, it cannot be achieved by means relying on one of the associated image recognition or control.

As described above, the robot system of the present example embodiment can easily execute calibration by correcting the relationship between the robot coordinate system and the camera coordinate system in such a way as to reduce the difference between the position information of the robot calculated by different means such as image and control using the robot itself as a sign.

(Modification)

FIG. 11 is a conceptual diagram illustrating an example of a configuration of a robot system 25 according to a modification of the second example embodiment. The robot system 20 according to the second example embodiment includes one imaging device 21. On the other hand, the robot system 25 includes at least two or more imaging devices 21 and 22.

Figure 12:
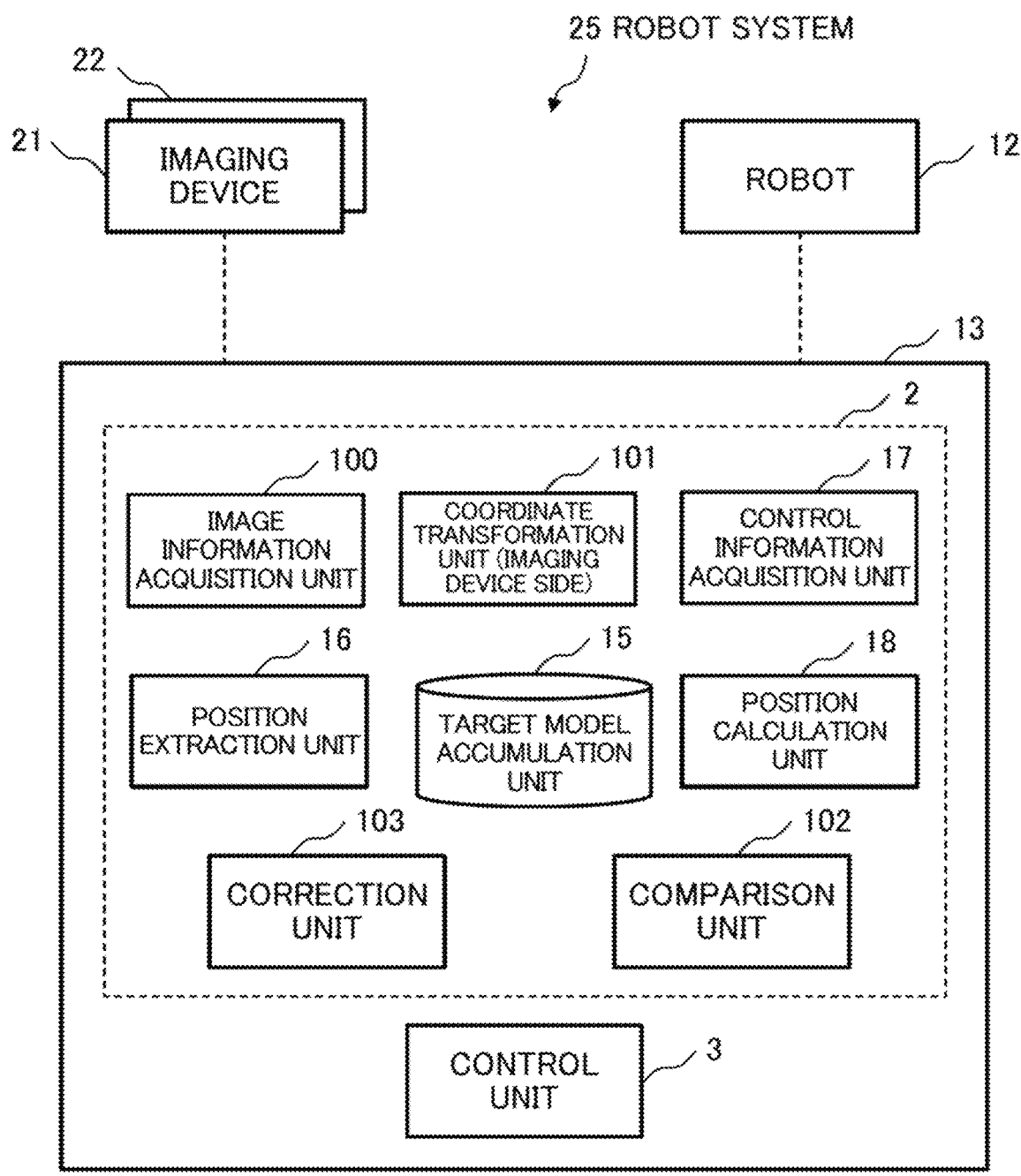
FIG. 12 is a block diagram illustrating an example of a configuration of the robot system 25 according to the modification of the second example embodiment.

FIG. 12 is a block diagram illustrating an example of a configuration of the robot system 25 according to the modification of the second example embodiment. In FIG. 12, the number of imaging devices is two. However, in the present example embodiment, the number of imaging devices is not limited to two, and at least two imaging devices may be provided. In FIG. 12, one coordinate transformation unit is used for a plurality of imaging devices, but the number of coordinate transformation units is not limited to one. In the present example embodiment, a plurality of coordinate transformation units may be used for a plurality of imaging devices.

In the robot system 25 according to the modification of the second example embodiment, by having the above-described configuration, a coordinate relationship between each of the imaging devices 21 and 22 and the robot 12, that is, a transformation matrix is obtained. That is, in the robot system 25, the coordinate relationship with respect to the reference of the robot 12 is obtained for each of 1 (1 is an integer equal to or more than 2) imaging devices 21 and 22 in which the same robot 12 enters the field of view. Therefore, in the robot system 25, the imaging devices 21 and 22 and the robot 12 are in a calibrated state.

Each of the plurality of imaging devices 21 and 22 is installed in such a way that the whole or a part of the robot falls within the imaging range (field of view). The plurality of imaging devices 21 and 22 need to include a mechanism that is fixed and does not move before and after calibration. The plurality of imaging devices 21 and 22 may include a manual or electric operating unit and may include a mechanism capable of arbitrarily changing the position and orientation thereof.

The robot 12 needs to include a mechanism in which the pedestal (base) is fixed and does not move before and after calibration. The robot 12 may include a mechanism capable of moving the pedestal by a manual or electric operating unit. Examples of such a configuration include an automatic guided vehicle (AGV). A relative relationship between the imaging devices 21 and 22 and the robot 12 does not change after the calibration performed in the present disclosure, that is, after the transformation of the coordinate transformation unit 101 is determined. However, even in a case where the relative relationship changes, the process of the present disclosure is executed each time, and thus a calibrated state can be always maintained.

With the above-described configuration, the robot system 25 according to the modification of the second example embodiment can acquire information about a region that cannot be observed by one imaging device by another imaging device and transform the information into a common coordinate system. Therefore, the robot system 25 according to the modification of the second example embodiment can easily calibrate the plurality of imaging devices and the robot. Therefore, the robot system 25 according to the modification of the second example embodiment can obtain a new effect that the robot 12 can be accurately operated even in an environment that is easily shielded by an obstacle or the robot itself, for example.

In addition, since the robot system 25 according to the modification of the second example embodiment transforms the information of the imaging devices from different positions and orientations into the common coordinate system, it can be applied to the integration of information from different viewpoints, that is, application of three-dimensional visualization of a target space.

Third Example Embodiment

Next, a robot system according to a third example embodiment of the present disclosure will be described with reference to the drawings.

Figure 13:
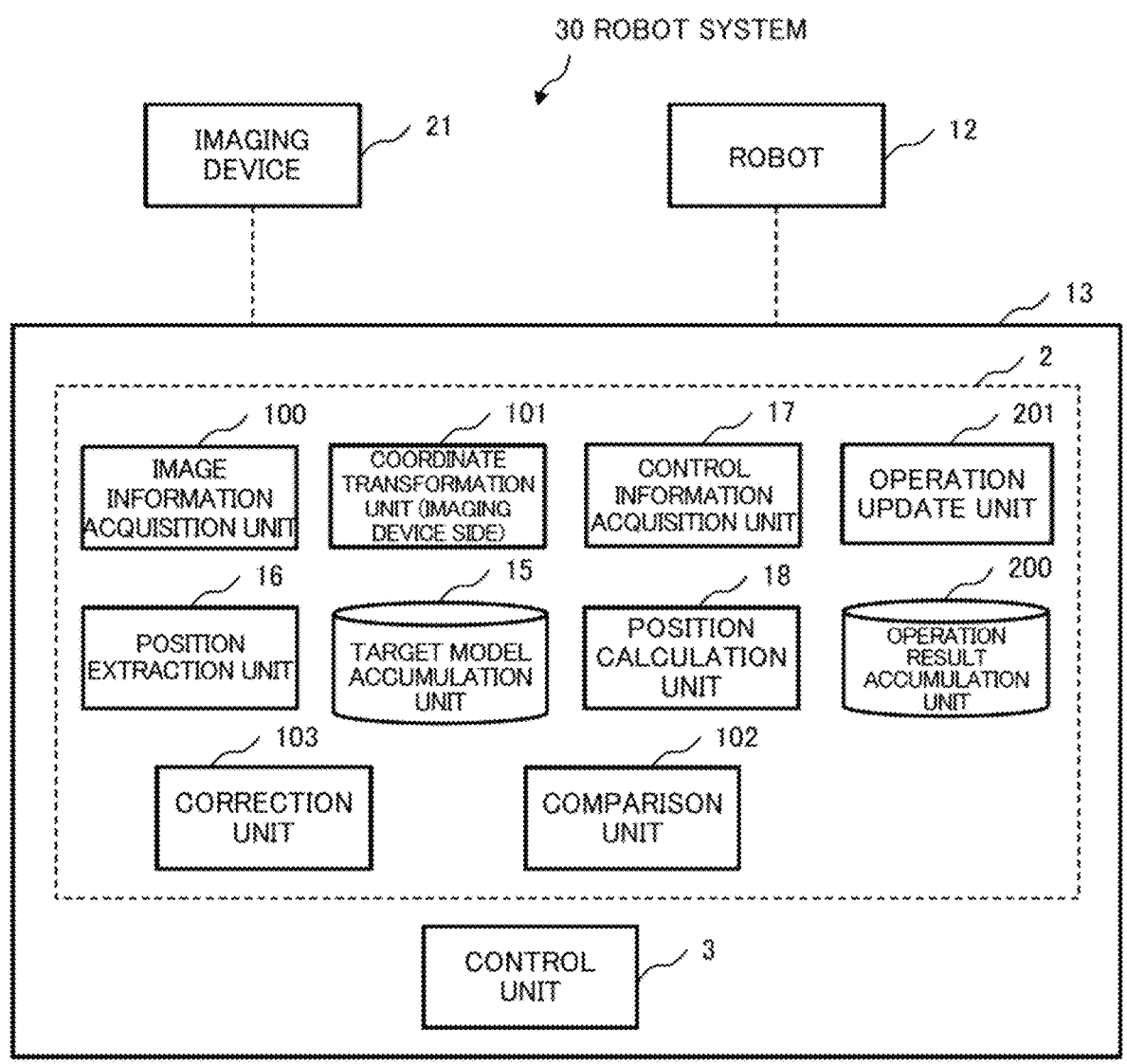
FIG. 13 is a block diagram illustrating an example of a configuration of a robot system 30 according to a third example embodiment.

FIG. 13 is a block diagram illustrating an example of a configuration of a robot system 30 of the present example embodiment. As illustrated in FIG. 13, the robot system 30 has a configuration in which an operation result accumulation unit 200 and an operation update unit 201 are added to the calibration unit 2 of the control device 13 in the second example embodiment. Therefore, the configuration of other parts is similar to that of the second example embodiment, and thus the description thereof is omitted.

A purpose of adding the operation result accumulation unit 200 and the operation update unit 201 as components of the robot system 30 will be described. The present disclosure describes a process of estimating a transformation matrix that associates different coordinate systems, as a problem in a robot system, that is, a method for solving a man-hour increase in system integration (SI) related to calibration. As one of the problems of the related art, there has been an operation in which a skilled person sets a plurality of appropriate orientations (poses) while viewing the robot in order to acquire data necessary for calibration.

By applying the second example embodiment of the present disclosure, it is not essential to set a plurality of orientations (poses), but it may be effective in order to secure a wider calibrated work space and improve accuracy. As described above, an object of the present example embodiment is to reduce the man-hours for setting the operation of the robot by an expert, which hinders the expansion of the calibrated space and improvement in accuracy.

(Configuration)

The operation result accumulation unit 200 accumulates an operation strategy (action policy) that defines a current operation (calibration operation) for obtaining a relationship between the robot coordinate system and the camera coordinate system of the robot 12 and comparison information (difference) that is an output of the comparison unit 102. As described above, the operation here refers to not a task given to the robot but an operation for calibration.

In the second example embodiment, the correction unit 103 corrects the transformation matrix on the basis of the difference output from the comparison unit 102, taking as an example the timing at which there is no change in the control information output from the robot 12, that is, the robot is not moving. In the present example embodiment, it is assumed that the robot 12 performs a specific operation for calibration on the basis of a certain action policy. The action policy can be given as a parameter describing the specific operation, and the action policy is associated to the operation in a one-to-one manner. For example, in the case of repetitive operation, a fluctuation width, a period, and the like correspond to an action policy. In the case of operation on a certain orbit such as a circle or an ellipse, an equation of the orbit corresponds to the action policy.

The robot system 30 performs processing similar to that of the robot system 20 given this action policy, and a difference that is comparison information is output from the comparison unit 102. Therefore, this difference is associated to the result of the given action policy in a one-to-one manner. The operation result accumulation unit 200 stores association between the action policy and the difference. Since the result of the difference also changes by changing the action policy, the action policy is accumulated in the operation result accumulation unit 200 every time the action policy is changed. Therefore, a relationship between the accumulated past action policy and the difference, that is, the past data set can also be used for the following operation update.

The operation update unit 201 updates the action policy based on the action policy and the comparison information (difference) accumulated in the operation result accumulation unit 200, and outputs the updated action policy to the robot 12. The robot 12 performs a calibration operation on the basis of the action policy. A specific control plan of the calibration operation, for example, generation of an operation trajectory, calculation of a control value to be input to a controller, and the like are performed by a general control planning device (not illustrated). In addition, a control plan for causing the robot 12 to execute a task is similarly performed by a general control planning device (not illustrated). In a situation where both of these control plans are given, which control plan is given priority may be a problem, but it is not a problem to be solved by the present disclosure, and for example, it is possible to sequentially and selectively schedule online or determine a rule in advance, and thus which control is given priority is not limited in the present example embodiment.

The operation update unit 201 updates the action policy from the relationship between the action policy up to that point in time and the difference accumulated in the operation result accumulation unit 200. Specifically, for example, when the action policy is described by the parameter θ, the operation can be updated by updating the parameter θ as follows. However, the parameter θ here is different from θ of the first and second example embodiments described above.

[Mathematical Formula 11]

$$\theta \leftarrow \theta + \delta\theta, \delta\theta = -\eta \frac{\partial J(\theta)}{\partial \theta} \quad \text{(Expression 11)}$$

In Expression 11, δθ represents an update amount of the parameter, η represents a coefficient (also referred to as a step size, a learning rate, and the like) that determines the update amount, and J represents a difference that is comparison information. The difference J can be expressed as a function of the parameter θ representing the action policy from the definition of the parameter θ described above, and the parameter θ is updated based on the change in the difference with respect to the change in the parameter θ (inclination of J, partial differentiation). The inclination of J can be calculated from various parameters θ accumulated in the operation result accumulation unit 200, that is, combination data of various action policies and the difference J.

In general, as amount of data increases, it is less likely to be affected by local changes, noise, and errors, and thus, an appropriate value can be calculated. That is, the accuracy of updating the parameter θ is improved. In addition, a coefficient η can be set to any value. However, if the coefficient η is set to a large value, the parameter θ is updated quickly, but since the amount of change in the value of the parameter θ is large, the parameter θ is updated to an inappropriate value, that is, the parameter θ is easily increased although it is supposed to be updated in a direction in which a difference becomes small.

On the other hand, if the coefficient η is set to a small value, the update of the parameter θ is delayed, but the above-described inappropriate update is relatively less likely to be performed. Therefore, the coefficient η needs to be appropriately selected. However, since it can be determined while being updated several times or can be determined from the past tendency, it is not limited in the present example embodiment. If the coefficient η is a positive number, a minus (−) is added before the coefficient η in order to move the parameter θ in a direction in which the difference decreases, that is, in a direction opposite to the inclination of J. However, Expression 11 shown here is an example including the definition thereof, and the present disclosure is not limited thereto.

The above-described process of the operation update unit 201 can be regarded as a framework of reinforcement learning since the action policy is updated in such a way that the difference becomes small, that is, the result of the operation is improved as a reward. Specifically, since the action policy corresponds to a strategy (policy) and the parameter θ corresponds to the parameter thereof, the update represented by Expression 11 can be said to be reinforcement learning based on a strategy gradient. As another representative reinforcement learning method, a method based on value repetition, a method using deep learning (deep Q-network (DQN), and the like can also be applied, and the method is not limited in the present example embodiment.

An effect of using such a reinforcement learning method is that the robot itself can autonomously acquire a desired operation in a given environment. Therefore, the operation setting of the robot by the expert, which is a problem, is unnecessary. Furthermore, it is possible to designate a desired operation by setting a reward, that is, J that is comparison information of Expression 11. Although the example of the difference has been described above, for example, if the entropy corresponding to the uncertainty (information amount) of the information is set, it is possible to acquire an operation in which the information amount increases, for example, an operation in which the range to be captured further increases even in a case where the range to be captured is limited or shielded by another object. Therefore, since the data of the calibration increases, as a result, it can be expected that the accuracy is improved (the difference decreases).

(Operation)

Figure 14:
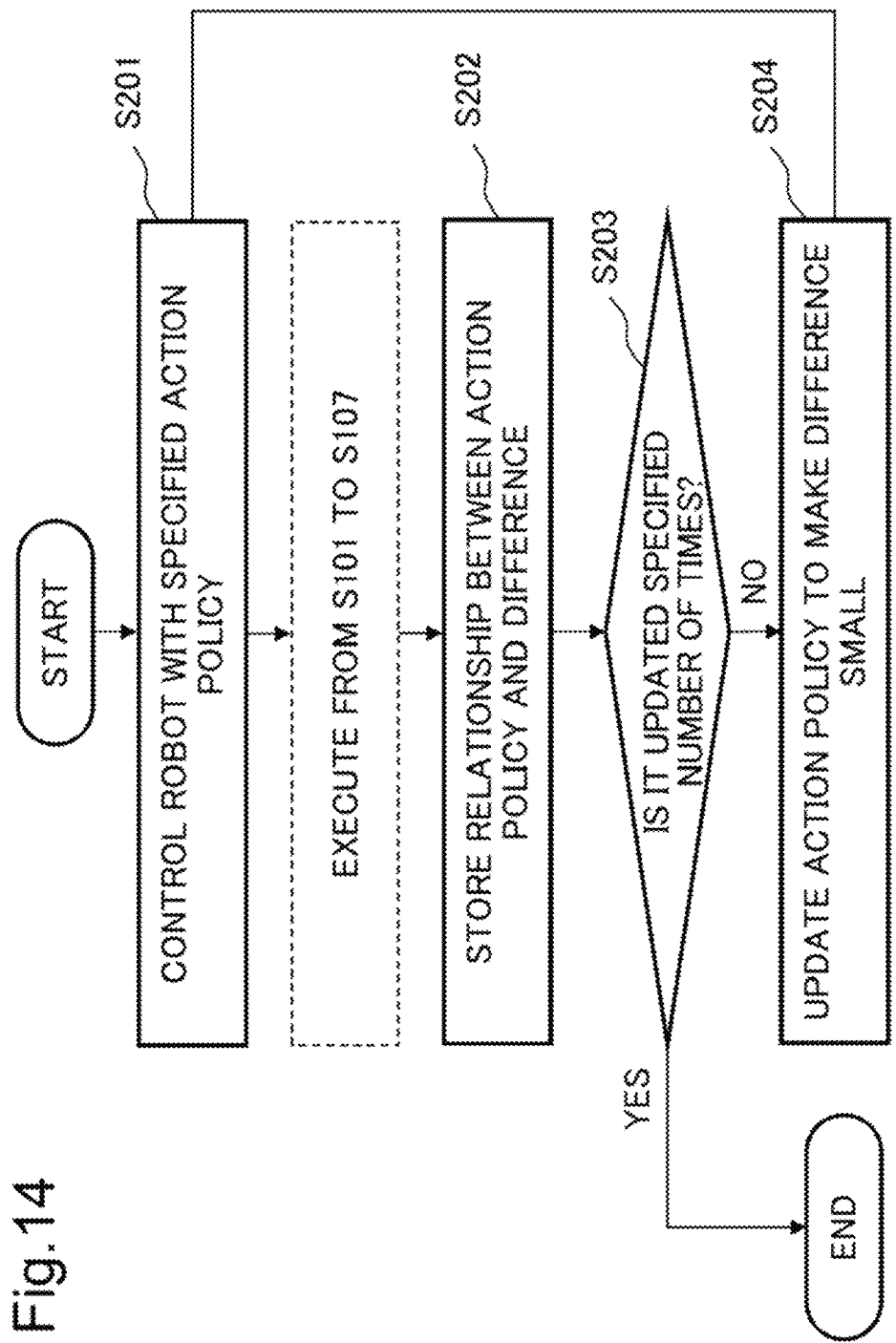
FIG. 14 is a flowchart for illustrating an operation of the robot system 30 according to the third example embodiment.

FIG. 14 is a flowchart for illustrating the operation of the robot system 30 according to the present example embodiment. In the description along the flowchart of FIG. 14, the robot system 30 will be described as a main body of the operation.

In the second example embodiment, as an example, the operation of repeating the correction of the transformation matrix by the correction unit 103 and the calculation of the difference by the comparison unit 102 at the timing when there is no change in the control information output from the robot 12, that is, when the robot is not moving has been described (steps S101 to S107). In the present example embodiment, the process of updating the position and orientation of the robot based on the action policy is added to the outside of the repetition (loop). Therefore, in the flowchart of FIG. 14, the flowchart portion of the second example embodiment is surrounded by a wavy line.

In the present example embodiment, first, the robot is controlled by a prescribed action policy (step S201). By this step S201, the robot 12 starts the operation associated to the action policy. In this state, as in the second example embodiment, an image of the robot 12 is captured and difference information is output (steps S101 to S105). In the present example embodiment, the robot 12 is in a moving state, but the above processing can be performed similarly to the second example embodiment. For example, the imaging of the robot 12 is acquired as a moving image, and processing can be performed by regarding each frame as a still image, or processing can be performed by regarding moving image data for a certain period of time as a series of time-series data, that is, by regarding that the dimension (amount) of data has increased.

Next, similarly to the second example embodiment, it is determined whether the difference is less than a predetermined threshold value (step S106), and if the result is equal to or more than the threshold value, the transformation matrix is corrected (step S107). However, in a case where the transformation matrix is corrected in the third example embodiment, since the robot 12 is operating, it is necessary to acquire image information from the imaging device 21 again and to use a transformation matrix to which a correction value is applied for the acquired image information. At this time, since the action policy of the robot is not changed, the operation is also not changed. First, an optimal transformation matrix is obtained in this state.

When the difference is less than the threshold value, a set of the action policy and the difference at this time is stored in the operation result accumulation unit 200 (step S202). Next, it is determined whether the action policy is updated a predetermined specified number of times (step S203). Here, if the number of updates reaches the predetermined number, the processing is ended, and if not reached, the action policy is updated in such a way that the difference becomes small (step S204). This specified number of times may be set, for example, while viewing the result of the difference or may be determined from the past tendency, and thus is not limited in the present example embodiment. However, increasing the specified number of times corresponds to increasing the amount of combination data of the action policy and the difference accumulated in the operation result accumulation unit 200 under the current given environment. In addition, since the number of times of updating the action policy also increases, these effects contribute to improvement of update accuracy of the action policy, that is, accuracy of the transformation matrix.

Here, effects unique to the third example embodiment that are not included in the second example embodiment will be described. In the present example embodiment, as a difference in configuration, the control device 13 further includes the operation result accumulation unit 200 and the operation update unit 201, and thus it is possible to provide a wider and highly accurate calibrated robot system without increasing the man-hours for operation setting of the robot by a skilled person (manually).

Furthermore, in the present example embodiment, the action policy and the comparison information (difference) based on the operation result are accumulated, that is, learned, and updated to the next operation. That is, in the present example embodiment, focusing on the feature of autonomously generating a new operation, it is possible to automatically (autonomously) maintain a robot system calibrated to have performance higher than performance relying on a skilled person (human hand) even if the environment changes. In the related art, one of the reasons why operation setting by a skilled person is required is that it is necessary to move in such a way to appropriately cover as large a volume as possible in a region where calibration is to be performed. This is because, in general, an imaging device is likely to be affected by lens distortion or the like at an end of its field of view. Furthermore, an imaging device capable of measuring a distance such as a depth camera has a limited direction (angle) in which the distance can be measured, and is also affected by an error depending on the shape and material of the object. Therefore, in the related art, it is necessary to move the robot at a position and an angle suitable for the imaging device.

This is apparent from a case where, in a motion capture system including a plurality of cameras, when a person moves a bright spot such as a penlight and performs calibration from the trajectory, accuracy depends on the trajectory, that is, how the bright spot is moved. Furthermore, in a case where the robot system is targeted, how to move the robot depends on the target robot itself, the imaging device, and the surrounding environment different for each place, and thus even a skilled person cannot always perform optimal operation setting. In addition, in order to maintain accuracy with respect to a deviation of an internal mechanism (actuator) of the robot with time and a peripheral environment that may change with time, periodic calibration is required. Based on the above, in the present example embodiment, even if the operation environment of the robot changes, calibration can be automatically (autonomously) performed, and the calibrated state can be maintained. Therefore, the present example embodiment can provide a robot system capable of reducing the man-hours for operation setting of the robot by an expert (manually).

(Modification)

The robot system 30 according to the third example embodiment includes one imaging device 21. On the other hand, the robot system 35 according to the modification of the third example embodiment includes at least two or more imaging devices 21 and 22, similarly to the robot system 25 according to the second example embodiment (FIGS. 11 and 12).

With such a configuration, similarly to the robot system 25 according to the modification of the second example embodiment, the robot system 35 according to the modification of the third example embodiment can acquire information about a region that cannot be observed by one imaging device by another imaging device and transform the information into a common coordinate system. Therefore, the robot system 35 according to the modification of the third example embodiment can easily calibrate the plurality of imaging devices and the robot. Therefore, the robot system 35 according to the modification of the third example embodiment can obtain a new effect that the robot 12 can be accurately operated even in an environment that is easily shielded by an obstacle or the robot itself, for example.

In addition, since the robot system 35 according to the modification of the third example embodiment transforms the information of the imaging devices from different positions and orientations into the common coordinate system, it can be applied to the integration of information from different viewpoints, that is, three-dimensional visualization of a target space.

Fourth Example Embodiment

Figure 15:
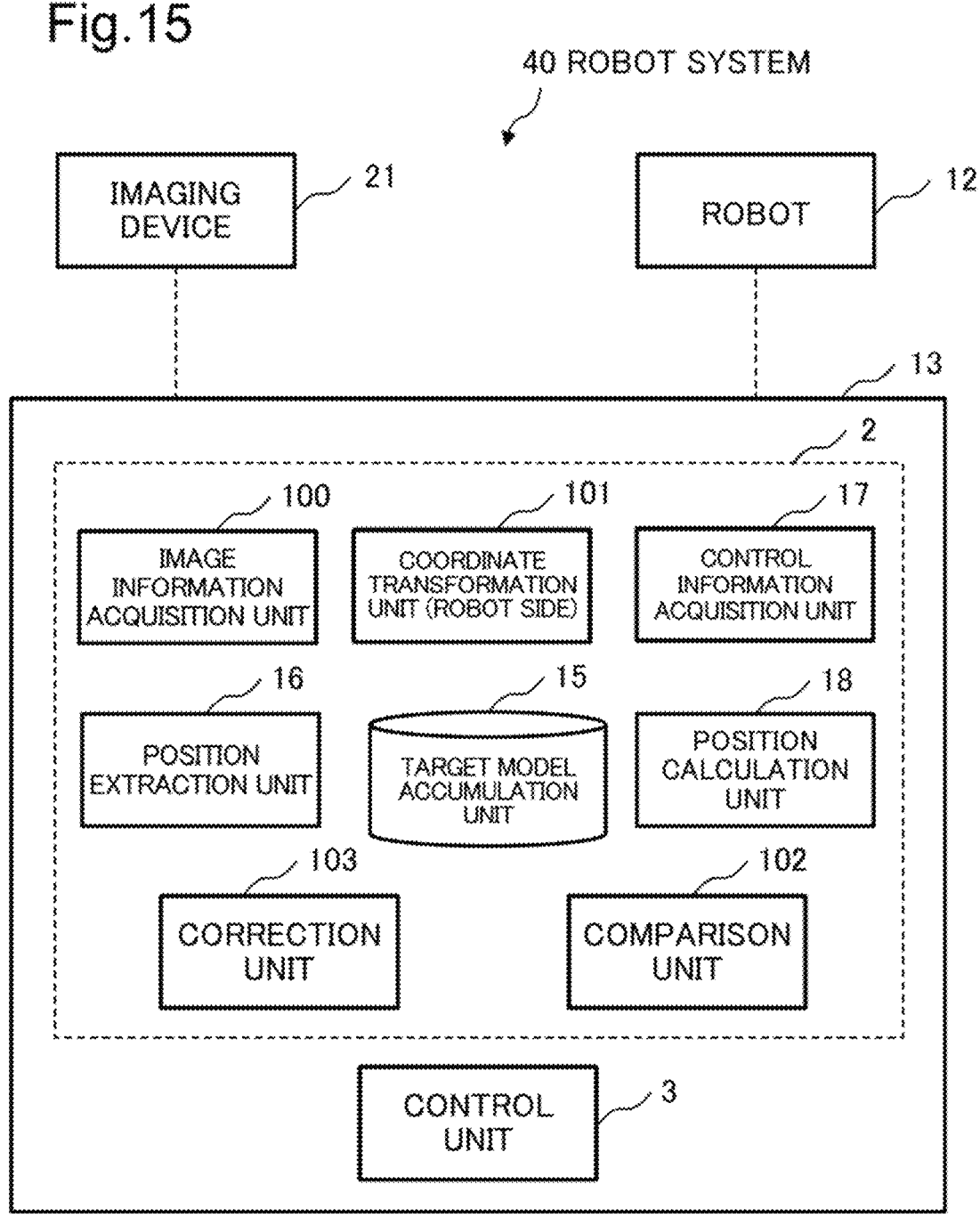
FIG. 15 is a block diagram illustrating an example of a configuration of a robot system 40 according to a fourth example embodiment.

Next, a robot system 40 according to a fourth example embodiment of the present disclosure will be described with reference to the drawings. FIG. 15 is a block diagram illustrating an example of a configuration of the robot system 40 of the present example embodiment. As shown in FIG. 15, the robot system 40 of the present example embodiment includes the same components as those of the second example embodiment. The present example embodiment is different from the second example embodiment in that image information is not input from the image information acquisition unit 100 on the imaging device side to the coordinate transformation unit 101, but image information is input from the control information acquisition unit 17 on the robot side to the coordinate transformation unit 101. Configurations and operations of other parts are similar to those of the second example embodiment, and thus the description thereof is omitted.

The robot system 40 uses the information obtained by the imaging device, that is, the information of the camera coordinate system as it is. On the other hand, the robot system 40 coordinate-transforms information obtained from the robot 12, that is, information in the robot coordinate system of the robot 12. As a result, the robot system 40 associates the relationship of the coordinate system between the imaging device 21 and the robot 12.

With such a configuration, the robot system 40 transforms the information of the robot coordinate system of the robot 12 to the world coordinate system with reference to the imaging device 21, that is, with the origin of the camera coordinate system as the origin. That is, the robot system 40 performs calibration between the imaging device 21 and the robot 12. Therefore, the present example embodiment can provide a robot system in which calibration between an imaging device and a plurality of robots is easy.

(Modification)

Figure 16:
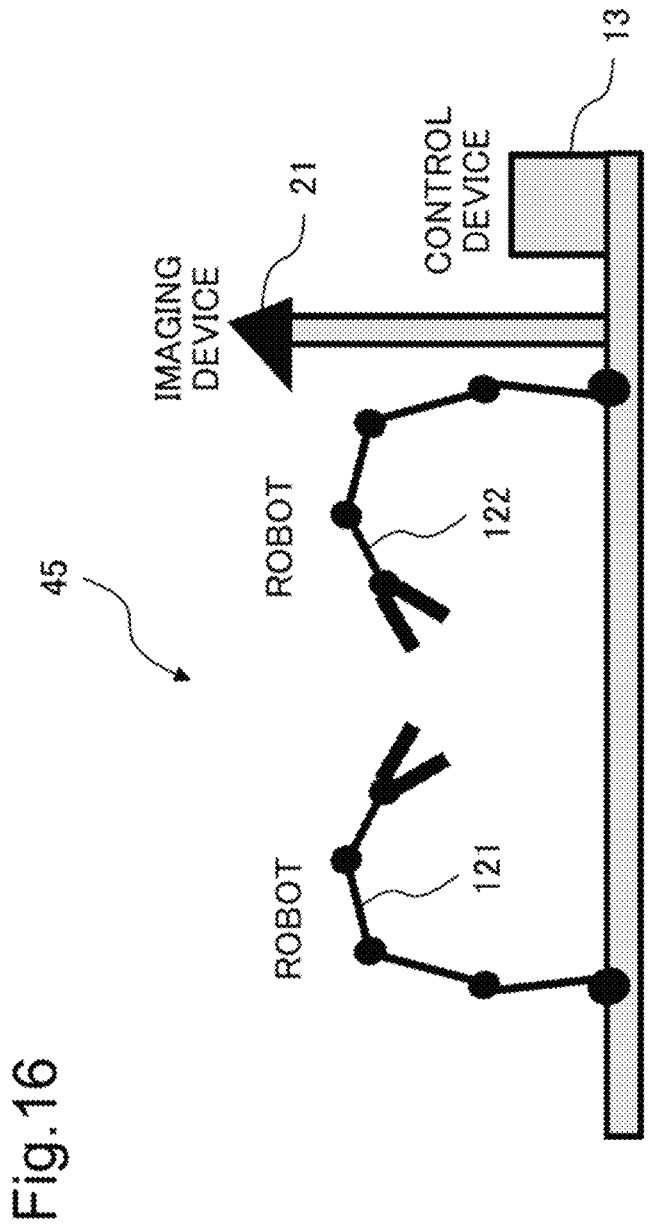
FIG. 16 is a conceptual diagram of a robot system 45 according to a modification of the fourth example embodiment.

FIG. 16 is a conceptual diagram of a robot system 45 according to a modification of the fourth example embodiment. The robot system 45 according to the modification of the fourth example embodiment has a configuration in which image information is input from the control information acquisition unit 17 on the robot side to the coordinate transformation unit 101. In FIG. 16, the number of robots is two. However, in the present example embodiment, the number of robots is not limited to two and only needs to be at least two. In FIG. 16, one coordinate transformation unit is used for a plurality of robots, but the number of coordinate transformation units is not limited to one. In the present example embodiment, a plurality of coordinate transformation units may be used for a plurality of imaging devices. In FIG. 16, one control device is used for a plurality of robots, but the number of control devices is not limited to one. In the present example embodiment, a plurality of control devices may be used for a plurality of robots.

With such a configuration, the robot system 45 can acquire the relationship of the coordinate system between at least two robots 121 and 122 and the imaging device 21. As described above, the robot system 45 can calibrate the plurality of robots 121 and 122 and the imaging device 21 by transforming the information in the robot coordinate system of the robot 12 to the world coordinate system with the origin of the camera coordinate system as the origin. However, the imaging device needs to be shared by the respective robots. That is, at least a part of the plurality of robots 121 and 122 needs to be included in the field of view of the imaging device 21.

With this configuration, the robot system 45 can install one common imaging device in an environment using a plurality of different robots, and can perform transformation into the world coordinate system with the origin of the coordinate system of the imaging device as the origin. Therefore, in the robot system 45, calibration can be easily performed between a plurality of robots and one imaging device that captures images of the plurality of robots. Therefore, in the robot system 45, for example, it is possible to achieve a new effect that a task that cannot be achieved by one robot or joint or cooperative work by a plurality of robots can be executed.

The present example embodiment may also include the operation result accumulation unit 200 and the operation update unit 201 that are the configurations of the third example embodiment. In the present example embodiment, the operation update unit 20 associated to each of the plurality of robots may be provided. With such a configuration, in the present example embodiment, the operation result accumulation unit 200 accumulates an action policy that defines a current operation (calibration operation) for obtaining a relationship between the robot coordinate system and the camera coordinate system of the robot 12 and comparison information (difference) that is an output of the comparison unit 102. Therefore, in the present example embodiment, even if the operating environment of the plurality of robots changes, calibration can be automatically (autonomously) performed between the plurality of robots and the imaging device, and this calibrated state can be continuously maintained. Therefore, according to the present example embodiment, it is possible to easily reduce the man-hours for the operation setting of the robot by an expert (manually).

Fifth Example Embodiment

Figure 17:
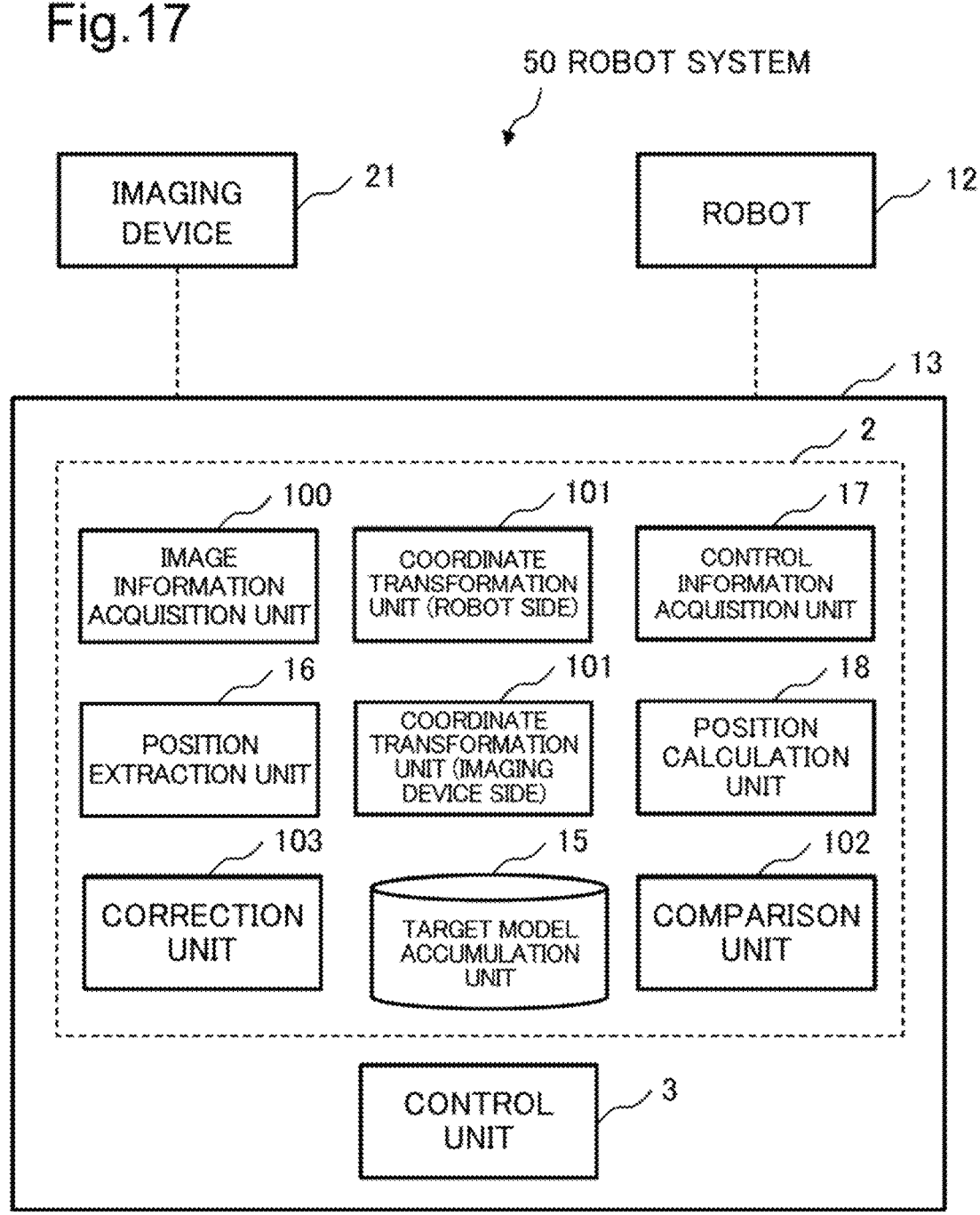
FIG. 17 is a block diagram illustrating an example of a configuration of a robot system 50 according to a fifth example embodiment.

Next, a robot system 50 according to a fifth example embodiment of the present disclosure will be described with reference to the drawings. FIG. 17 is a block diagram illustrating an example of a configuration of the robot system 50 of the present example embodiment. As illustrated in FIG. 17, in the robot system 50, the coordinate transformation units 101 are included on both the imaging device 21 side and the robot 12 side. Configurations and basic operations of other parts are similar to those of the second example embodiment and the fourth example embodiment, and thus, the description thereof is omitted.

In the second example embodiment, by providing the coordinate transformation unit 101 on the imaging device 21 side, the coordinate system of the imaging device can be transformed to the world coordinate system with the origin of the robot coordinate system of the robot 12 as the origin. In the fourth example embodiment, by providing the coordinate transformation unit 101 on the robot 12 side, the coordinate system of the robot can be transformed to the world coordinate system with the origin of the camera coordinate system of the imaging device 21 as the origin.

In the present example embodiment, by providing both of them, it is possible to perform transformation in such a way that the coordinate systems of the imaging device 21 and the robot 12 match each other with respect to a certain any reference, that is, the world coordinate system having any point as the origin. With this configuration, in the entire robot system 50 including the imaging device 21 and the robot 12, it is possible to arbitrarily set a reference point (origin) suitable for the robot 12 to execute a task (perform an operation) or a point easily recognized by a person in a case of performing cooperative work with the person, for example, the center of the task space. Therefore, in the present example embodiment, since any reference point can be set as the origin, an effect of increasing the degree of freedom of calibration can be obtained.

Figure 18:
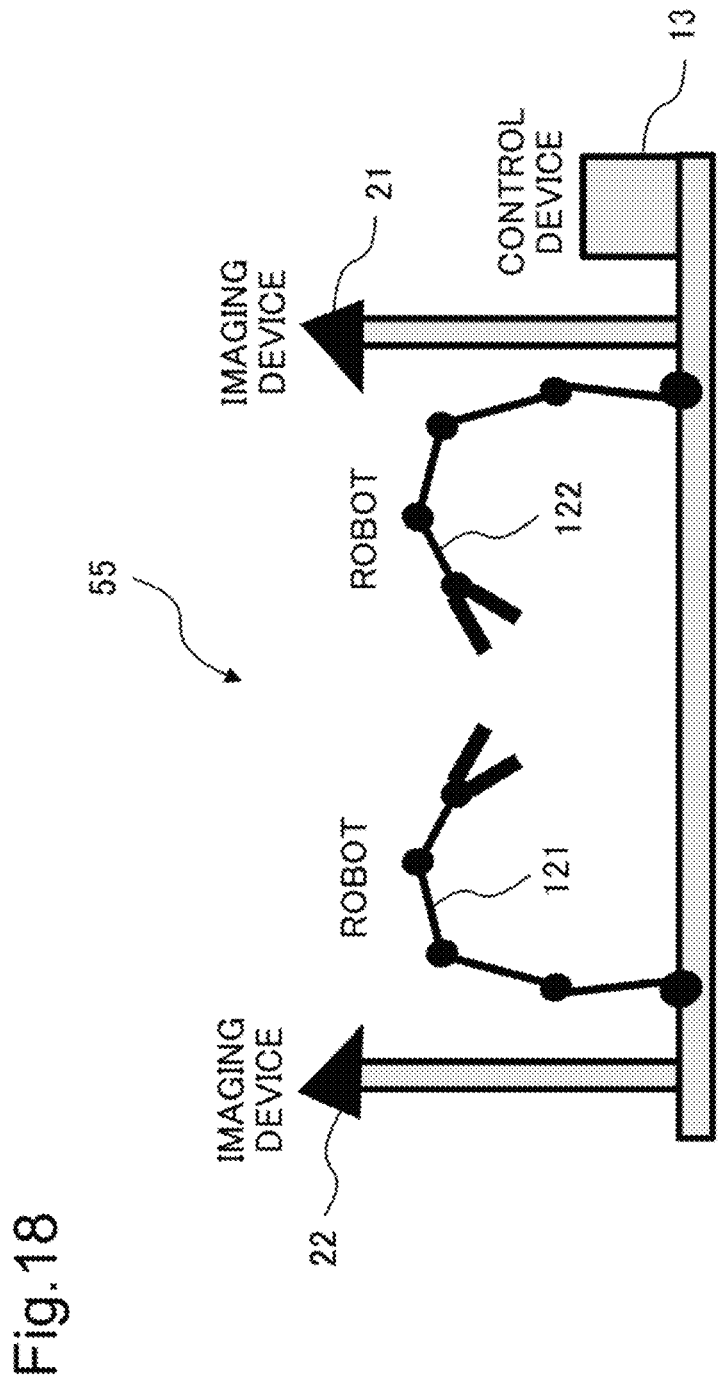
FIG. 18 is a conceptual diagram of a robot system 55 according to a modification of the fifth example embodiment.

In the present example embodiment, even in a configuration including a plurality of imaging devices 21 and 22 and a plurality of robots 121 and 122 as illustrated in FIG. 18, each coordinate system can be transformed into the world coordinate system having any reference point as the origin. That is, according to the present example embodiment, the plurality of imaging devices and the plurality of robots can be easily calibrated with respect to any reference point.

By implementing such a configuration, the present example embodiment can simultaneously obtain an effect of covering a region that cannot be observed by one imaging device obtained in the second example embodiment by a plurality of imaging devices, and an effect of being able to perform a task that cannot be achieved by one robot obtained in the fourth example embodiment or a joint or cooperative work by a plurality of robots.

Sixth Example Embodiment

Figure 19:
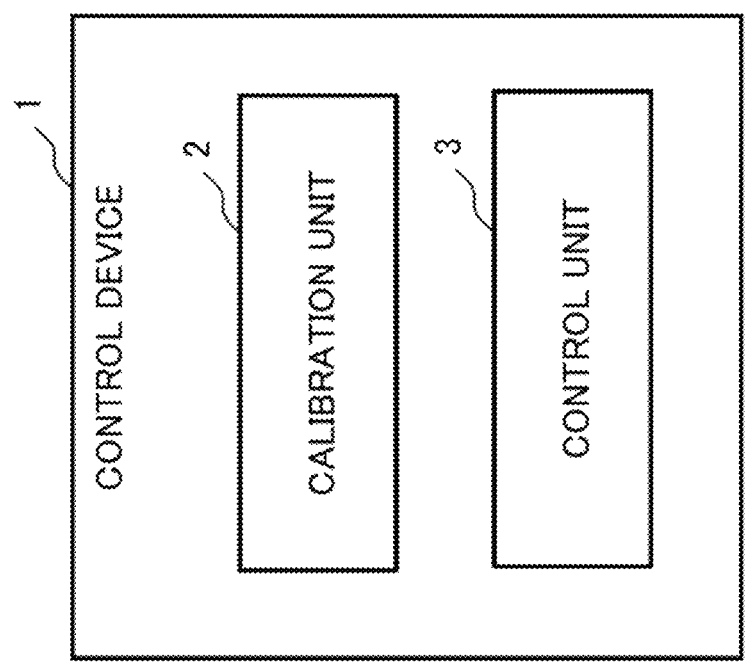
FIG. 19 is a block diagram illustrating an example of a configuration of a control device 1 according to a sixth example embodiment.

Next, a control device 1 according to a sixth example embodiment of the present disclosure will be described with reference to the drawings. FIG. 19 is a block diagram illustrating an example of a configuration of the control device 1 of the present example embodiment. As illustrated in FIG. 19, the control device 1 includes a calibration unit 2 and a control unit 3. The calibration unit 2 and the control unit 3 are an example embodiment of a calibration means and a control means, respectively. The control device 1 according to the sixth example embodiment illustrates the minimum constituent elements of the above-described example embodiment.

The calibration unit 2 calculates a parameter representing transformation between an image coordinate system or a camera coordinate system that is a first coordinate system for image information obtained by capturing an image of a robot (not illustrated) that is a target to be controlled and a robot coordinate system or a world coordinate system that is a second coordinate system that defines an operation of the target to be controlled by using a position of the target to be controlled in the first coordinate system and a position of the target to be controlled in the second coordinate system.

Further, the control unit 3 uses image information containing the target to be controlled and the calculated parameter to calculate the position of the target to be controlled for the second coordinate system, and controls the target to be controlled on the basis of the calculated position of the target to be controlled.

In the present example embodiment, on the basis of the position of the target to be controlled in the first coordinate system and the position of the target to be controlled in the second coordinate system, it is possible to obtain an effect that calibration can be easily performed by calculating a parameter representing transformation between the first coordinate system for image information and the second coordinate system that defines the operation of the target to be controlled.

The present invention has been described above by taking the above-described example embodiments as examples. However, the present invention is not limited to the above-described example embodiments. That is, the present invention can be applied to various forms that can be understood by those skilled in the art within the scope of the present invention.

Some or all of the above example embodiments may be described as the following supplementary notes, but are not limited to the following.
(Supplementary Note 1)
A control device including:
a calibration means configured to calculate a parameter representing transformation between a first coordinate system for image information obtained by capturing an image of a target to be controlled and a second coordinate system that defines an operation of the target to be controlled by using position information representing a position of the target to be controlled in the first coordinate system and position information representing a position of the target to be controlled in the second coordinate system; and
a control means configured to calculate the position information of the target to be controlled in the second coordinate system by using image information including the target to be controlled and the calculated parameter, and to control the target to be controlled based on the calculated position information of the target to be controlled.
(Supplementary Note 2)
The control device according to supplementary note 1, wherein
the calibration means
performs a predetermined calculation on the parameter with respect to the position of the target to be controlled in the image information and the position of the target to be controlled based on the control information, and
calculates a distribution of the position of the target to be controlled in the first coordinate system and a distribution of the position of the target to be controlled in the second coordinate system.
(Supplementary Note 3)
The control device according to supplementary note 1 or 2, wherein
the calibration means
calculates a distribution of the position of the target to be controlled in the first coordinate system and a distribution of the position of the target to be controlled in the second coordinate system by adding random numbers to the position of the target to be controlled in the image information and the position of the target to be controlled based on the control information.
(Supplementary Note 4)
The control device according to supplementary note 3, wherein
the random number is a random number according to a normal distribution.
(Supplementary Note 5)
The control device according to any one of supplementary Notes 1 to 4, including:
a coordinate transformation means configured to transform a position in an image coordinate system or a camera coordinate system into a position in a world coordinate system, wherein
the calibration means extracts the position of the target to be controlled in the image information by using the image information represented in the world coordinate system transformed by the coordinate transformation means.
(Supplementary Note 6)
The control device according to any one of supplementary notes 1 to 4, including
a coordinate transformation means configured to transform a position in a robot coordinate system into a position in a world coordinate system, wherein
the calibration means calculates the position of the target to be controlled using the control information represented in the world coordinate system transformed by the coordinate transformation means.
(Supplementary Note 7)
The control device according to any one of supplementary notes 1 to 4, including:
a first coordinate transformation means configured to transform a position in an image coordinate system or a position in a camera coordinate system into a position in a world coordinate system; and
a second coordinate transformation means configured to transform a position in a robot coordinate system into a position in the world coordinate system, wherein
the calibration means
extracts the position of the target to be controlled in the image information by using the image information represented in the world coordinate system transformed by the first coordinate transformation means, and calculates the position of the target to be controlled using the control information represented in the world coordinate system transformed by the second coordinate transformation means.

(Supplementary Note 8)

The control device according to any one of supplementary notes 1 to 7, further including:

an update means configured to update an action policy with a decrease in a difference between the position information indicating the position transformed by using the parameter from the position information indicating the position of the target to be controlled in a first coordinate system and the position information indicating the position of the target to be controlled in the second coordinate system as a reward.

(Supplementary Note 9)

A control system including:

a control device including a calibration means configured to calculate a parameter representing transformation between a first coordinate system for image information obtained by capturing an image of a target to be controlled and a second coordinate system that defines an operation of the target to be controlled by using position information representing a position of the target to be controlled in the first coordinate system and position information representing a position of the target to be controlled in the second coordinate system, and a control means configured to calculate the position information of the target to be controlled in the second coordinate system by using image information including the target to be controlled and the calculated parameter, and to control the target to be controlled based on the calculated position information of the target to be controlled; and a target to be controlled that is controlled by the control device.

(Supplementary Note 10)

A control method including:

calculating a parameter representing transformation between a first coordinate system for image information obtained by capturing an image of a target to be controlled and a second coordinate system that defines an operation of the target to be controlled by using position information representing a position of the target to be controlled in the first coordinate system and position information representing a position of the target to be controlled in the second coordinate system;

calculating the position information of the target to be controlled in the second coordinate system by using image information including the target to be controlled and the calculated parameter; and controlling the target to be controlled based on the calculated position information of the target to be controlled.

(Supplementary Note 11)

A recording medium that records a control program causing a computer to execute:

a process of calculating a parameter representing transformation between a first coordinate system for image information obtained by capturing an image of a target to be controlled and a second coordinate system that defines an operation of the target to be controlled by using position information representing a position of the target to be controlled in the first coordinate system and position information representing a position of the target to be controlled in the second coordinate system;

a process of calculating position information of the target to be controlled in the second coordinate system by using image information including the target to be controlled and the calculated parameter; and a process of controlling the target to be controlled based on the calculated position information of the target to be controlled.

REFERENCE SIGNS LIST 1 control device
2 calibration unit
3 control unit
10, 20, 25, 30, 35, 40, 45, 50, 55 robot system
11 observation device
12, 121, 122 robot
13 control device
14 observation information acquisition unit
15 target model accumulation unit
16 position extraction unit
17 control information acquisition unit
18 position calculation unit
19 parameter estimation unit
21, 22 imaging device
100 image information acquisition unit
101 coordinate transformation unit
102 comparison unit
103 correction unit
200 operation result accumulation unit
201 operation update unit

What is claimed is:

1. A control device comprising:
a memory storing instructions; and
one or more processors configured to execute the instructions to:
calculate a parameter representing transformation between a first coordinate system for image information obtained by capturing an image of a target to be controlled and a second coordinate system that defines an operation of the target to be controlled by using position information representing a position of the target to be controlled in the first coordinate system and position information representing a position of the target to be controlled in the second coordinate system;
perform a predetermined calculation on the parameter with respect to the position of the target to be controlled in the image information and the position of the target to be controlled based on control information;
calculate a distribution of the position of the target to be controlled in the first coordinate system and a distribution of the position of the target to be controlled in the second coordinate system;
calculate the position information of the target to be controlled in the second coordinate system by using image information including the target to be controlled and the calculated parameter; and
control the target to be controlled based on the calculated position information of the target to be controlled.

2. The control device according to claim 1, wherein the one or more processors are configured to execute the instructions to:
calculate the distribution of the position of the target to be controlled in the first coordinate system and the distribution of the position of the target to be controlled in the second coordinate system by adding random numbers to the position of the target to be controlled in the image information and the position of the target to be controlled based on the control information.

3. The control device according to claim 2, wherein the random number is a random number according to a normal distribution.

4. The control device according to claim 1, wherein the one or more processors are further configured to execute the instructions to:
   transform a position in an image coordinate system or a camera coordinate system into a position in a world coordinate system; and
   extract the position of the target to be controlled in the image information by using the image information represented in the world coordinate system.

5. The control device according to claim 1, wherein the one or more processors are further configured to execute the instructions to:
   transform a position in a robot coordinate system into a position in a world coordinate system; and
   calculate the position of the target to be controlled using the control information represented in the world coordinate system.

6. The control device according to claim 1, wherein the one or more processors are further configured to execute the instructions to:
   transform a position in an image coordinate system or a position in a camera coordinate system into a position in a world coordinate system;
   transform a position in a robot coordinate system into a position in the world coordinate system;
   extract the position of the target to be controlled in the image information by using the image information represented in the world coordinate system; and
   calculate the position of the target to be controlled using the control information represented in the world coordinate system.

7. The control device according to claim 1, wherein the one or more processors are further configured to execute the instructions to:
   update an action policy with a decrease in a difference between the position information indicating the position transformed by using the parameter from the position information indicating the position of the target to be controlled in the first coordinate system and the position information indicating the position of the target to be controlled in the second coordinate system as a reward.

8. A control method performed by a computer and comprising:
   calculating a parameter representing transformation between a first coordinate system for image information obtained by capturing an image of a target to be controlled and a second coordinate system that defines an operation of the target to be controlled by using position information representing a position of the target to be controlled in the first coordinate system and position information representing a position of the target to be controlled in the second coordinate system;
   performing a predetermined calculation on the parameter with respect to the position of the target to be controlled in the image information and the position of the target to be controlled based on control information;
   calculating a distribution of the position of the target to be controlled in the first coordinate system and a distribution of the position of the target to be controlled in the second coordinate system;
   calculating the position information of the target to be controlled in the second coordinate system by using image information including the target to be controlled and the calculated parameter; and
   controlling the target to be controlled based on the calculated position information of the target to be controlled.

9. A non-transitory computer-readable recording medium storing a control program executable by a computer to perform processing comprising:
   calculating a parameter representing transformation between a first coordinate system for image information obtained by capturing an image of a target to be controlled and a second coordinate system that defines an operation of the target to be controlled by using position information representing a position of the target to be controlled in the first coordinate system and position information representing a position of the target to be controlled in the second coordinate system;
   performing a predetermined calculation on the parameter with respect to the position of the target to be controlled in the image information and the position of the target to be controlled based on control information;
   calculating a distribution of the position of the target to be controlled in the first coordinate system and a distribution of the position of the target to be controlled in the second coordinate system;
   calculating the position information of the target to be controlled in the second coordinate system by using image information including the target to be controlled and the calculated parameter; and
   controlling the target to be controlled based on the calculated position information of the target to be controlled.

* * * * *